United States Patent
Denham

(10) Patent No.: US 9,363,203 B2
(45) Date of Patent: *Jun. 7, 2016

(54) MODULAR INTERCONNECT STRUCTURE

(75) Inventor: Martin S. Denham, Bend, OR (US)

(73) Assignee: Intel Corporation, Santa Clara, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/193,238

(22) Filed: Jul. 28, 2011

(65) Prior Publication Data

US 2012/0020365 A1   Jan. 26, 2012

Related U.S. Application Data

(63) Continuation of application No. 11/095,241, filed on Mar. 31, 2005, now Pat. No. 7,990,983.

(51) Int. Cl.

| | | |
|---|---|---|
| H04L 12/50 | (2006.01) | |
| H04L 12/58 | (2006.01) | |
| G06F 15/173 | (2006.01) | |
| G06F 15/16 | (2006.01) | |
| G06F 13/00 | (2006.01) | |
| H04L 12/933 | (2013.01) | |
| H04L 12/935 | (2013.01) | |

(52) U.S. Cl.
CPC ............... *H04L 49/15* (2013.01); *H04L 49/101* (2013.01); *H04L 49/30* (2013.01)

(58) Field of Classification Search
CPC ........ H04L 49/15; H04L 49/101; H04L 49/30
USPC .......... 709/244, 238; 714/712, 30, 4, 11, 216; 370/386, 392, 403, 389, 395.413, 428; 710/317, 100
See application file for complete search history.

(56) References Cited

U.S. PATENT DOCUMENTS

| | | | |
|---|---|---|---|
| 4,866,606 A | 9/1989 | Kopetz | |
| 5,175,824 A | 12/1992 | Soderbery et al. | |
| 5,930,256 A | 7/1999 | Greene et al. | |
| 6,138,185 A * | 10/2000 | Nelson et al. | 710/33 |
| 6,208,667 B1 | 3/2001 | Caldara et al. | |

(Continued)

FOREIGN PATENT DOCUMENTS

CN         1402140         3/2003

OTHER PUBLICATIONS

Publication "Low-Latency Virtual-Channel Routers for On-Chip Networks", Mullins et al., in IEEE ISCA'2004, p. 1-10.*

(Continued)

*Primary Examiner* — Alpus H Hsu
*Assistant Examiner* — Camquyen Thai
(74) *Attorney, Agent, or Firm* — Schwegman Lundberg & Woessner, P.A.

(57) ABSTRACT

Some embodiments of the invention include an interconnect structure to transfer data among a plurality of devices. The interconnect structure includes a crossbar and a number of interconnect branches coupled to the crossbar. Each of the interconnect branches includes a number of connector circuits coupled in series to transfer data in a group of devices of the plurality of devices. The crossbar includes a number of connector circuits coupled in series to allow one group of devices from one interconnect branch to exchange data with another group of devices from another interconnect branch. Other embodiments are described and claimed.

18 Claims, 12 Drawing Sheets

(56) References Cited

U.S. PATENT DOCUMENTS

| | | | |
|---|---|---|---|
| 6,377,077 B1 | 4/2002 | Shiraishi | |
| 6,477,659 B1 | 11/2002 | Ho | |
| 6,557,070 B1* | 4/2003 | Noel, Jr. | 710/317 |
| 6,621,818 B1 | 9/2003 | Szczepanek et al. | |
| 6,760,870 B1* | 7/2004 | Snyder et al. | 714/712 |
| 6,963,989 B1 | 11/2005 | Cullum et al. | |
| 7,079,485 B1 | 7/2006 | Lau et al. | |
| 7,110,394 B1 | 9/2006 | Chamdani et al. | |
| 7,197,032 B1 | 3/2007 | Gammenthaler et al. | |
| 7,319,695 B1* | 1/2008 | Agarwal et al. | 370/388 |
| 7,321,981 B1* | 1/2008 | Muntz | 714/4.3 |
| 7,426,632 B2 | 9/2008 | Denham | |
| 7,990,983 B2 | 8/2011 | Denham | |
| 2002/0083255 A1 | 6/2002 | Greeff et al. | |
| 2002/0110130 A1* | 8/2002 | Benayoun et al. | 370/401 |
| 2003/0040898 A1 | 2/2003 | McWilliams et al. | |
| 2003/0043797 A1* | 3/2003 | Rashid et al. | 370/389 |
| 2003/0108058 A1* | 6/2003 | Black | H04L 12/4625 370/403 |
| 2003/0191857 A1* | 10/2003 | Terrell et al. | 709/244 |
| 2003/0202510 A1* | 10/2003 | Witkowski et al. | 370/386 |
| 2003/0221043 A1 | 11/2003 | Sota | |
| 2004/0081185 A1* | 4/2004 | Grow | 370/418 |
| 2004/0114588 A1 | 6/2004 | Bhaskaran | |
| 2004/0151209 A1 | 8/2004 | Cummings et al. | |
| 2005/0091432 A1* | 4/2005 | Adams et al. | 710/100 |
| 2005/0163114 A1 | 7/2005 | Konig et al. | |
| 2006/0143358 A1* | 6/2006 | Edirisooriya et al. | 710/317 |
| 2006/0221984 A1 | 10/2006 | Denham | |
| 2006/0224912 A1 | 10/2006 | Denham | |

OTHER PUBLICATIONS

Mullins, Robert, "Low Latency Virtua-Channel Routers for On-Chip Networks", IEEE, 2004.*

U.S. Appl. No. 11/095,289, Non-Final Office Action mailed Oct. 9, 2007, 17 pgs.

U.S. Appl. No. 10/095,289, Non-Final Office Action mailed Oct. 9, 2007, 17 pgs.

U.S. Appl. No. 11/095,241, Non-Final Office Action mailed Sep. 14, 2010, 25 pgs.

U.S. Appl. No. 11/095,241, Final Office Action mailed Sep. 30, 2009, 18 pgs.

U.S. Appl. No. 11/095,241, Non-Final Office Action mailed Mar. 29, 2010, 19 pgs.

U.S. Appl. No. 11/095,241, Non-Final Office Action mailed Oct. 21, 2008, 20 pgs.

U.S. Appl. No. 11/095,241, Notice of Allowance mailed Mar. 4, 2011, 12 pgs.

U.S. Appl. No. 11/095,241, Preliminary Amendment mailed Oct. 24, 2007, 9 pgs.

U.S. Appl. No. 11/095,241, Response filed Jan. 21, 2009 to Non Final Office Action mailed Oct. 21, 2008, 17 pgs.

U.S. Appl. No. 11/095,241, Response filed Feb. 1, 2010 to Final Office Action mailed Sep. 30, 2009, 15 pgs.

U.S. Appl. No. 11/095,241, Response filed Jun. 29, 2010 to Non Final Office Action mailed Mar. 29, 2010, 17 pgs.

U.S. Appl. No. 11/095,241, Response filed Jun. 30, 2008 to Restriction Requirement mailed May 29, 2008, 10 pgs.

U.S. Appl. No. 11/095,241, Response filed Dec. 14, 2010 to Non Final Office Action mailed Sep. 14, 2010, 17 pgs.

U.S. Appl. No. 11/095,241, Restriction Requirement mailed May 29, 2008, 5 pgs.

U.S. Appl. No. 11/095,289, Notice of Allowance mailed May 2, 2008, 10 pgs.

U.S. Appl. No. 11/095,289, Response filed Jan. 9, 2008 to Non-Final Office Action mailed Oct. 9, 2007, 15 pgs.

Application Serial No. 200610084167.6, Office Action Mailed Nov. 11, 2008, 25 pgs.

International (People's Republic of China) Application No. 200610084167.6 Office Action mailed Dec. 21, 2007, 40.

Office Action Chinese Application No. 200610084165.7, 21 pgs.

* cited by examiner

MODULAR INTERCONNECT STRUCTURE

PRIORITY APPLICATION

This application is a continuation of U.S. application Ser. No. 11/095,241, filed Mar. 31, 2005, now U.S. Pat. No. 7,990,983, which is incorporated herein by reference in its entirety.

FIELD

Embodiments of the present invention relate to structures for transferring data in integrated circuits.

BACKGROUND

An integrated circuit or a circuit chip usually has a number of circuit components or devices. Some integrated circuits transfer data among the devices via an interconnect structure consisting of a single bus. The bus often has multiple conductive lines shared by the devices.

At some transfer speed, a conventional bus may need a large number of lines to efficiently handle a large volume of data transferred among the devices. The large number of lines may congest circuit wiring in the circuit chip and may increase aggregated line-to-line capacitance due to the necessity of using minimum metal pitches, thereby increasing power consumption and constricting bus performance. The large number of lines may also increase the size of the circuit chip leading to higher cost.

Further, some conventional circuit chips may have devices connected among each other via many different kinds of buses or different kinds of circuit connections. Thus, some conventional circuit chips lack modularity because many different structures may be needed to suit different kinds of circuit connections.

In addition, different kinds of circuit connections requirement may create design complexity and erase the option to reuse one kind of circuit connection to connect all or most of the devices in the circuit chip.

Moreover, different kinds of circuit connections may hamper the testability of the circuit chip because many different testing circuit models may be needed to test different circuit connections.

DESCRIPTION OF EMBODIMENTS

Figure 1:
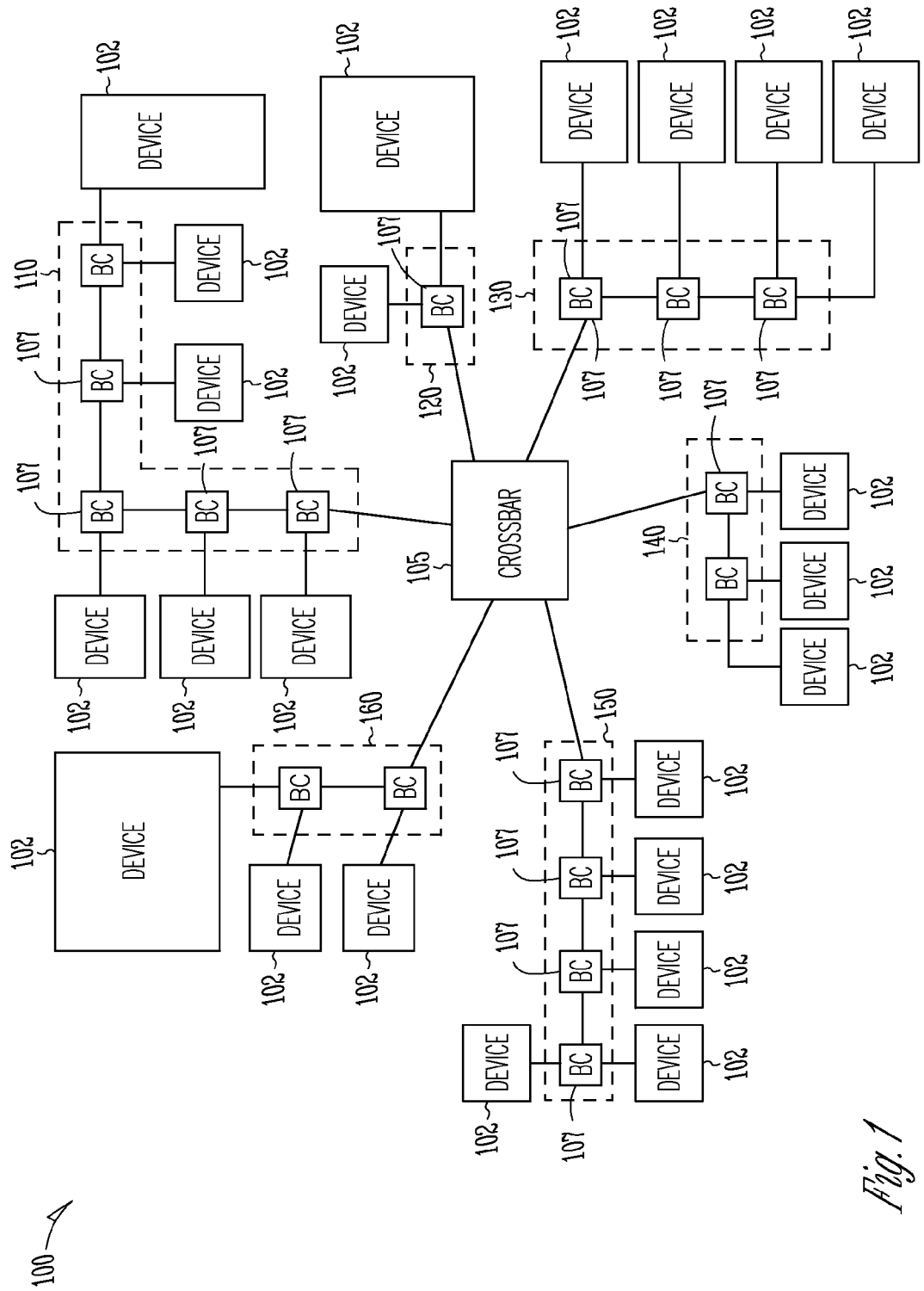
FIG. 1 shows a system having an interconnect structure according to an embodiment of the invention.

The following description and the drawings illustrate some specific embodiments of the invention sufficiently to enable those skilled in the art to practice the embodiments of the invention. Other embodiments may incorporate structural, logical, electrical, process, and other changes. In the drawings, like features or like numerals describe substantially similar components throughout the several views. Examples merely typify possible variations. Portions and features of some embodiments may be included in or substituted for those of others. The scope of various embodiments is determined by the appended claims, along with the full range of equivalents to which such claims are entitled.

FIG. 1 shows a system having an interconnect structure according to an embodiment of the invention. In system 100, the interconnect structure includes a crossbar 105 and a number of interconnect branches 110, 120, 130, 140, 150, and 160 to allow a number of devices 102 to transfer data among each other.

At least one of the devices 102 includes an integrated circuit. Examples of devices 102 include core processing circuits to process data, memory circuits such as cache memory circuits to store data, memory controller circuits to control data transferred between system 100 and memory circuits outside system 100. Other examples of devices 102 include input and output circuits to receive and send data to and from system 100. In some embodiments, the input and output circuits represented by devices 102 include network connection circuits to allow system 100 to transfer data with other components in a network where system 100 resides. In some embodiments, system 100 is formed on a single integrated circuit chip.

The interconnect branches 110, 120, 130, 140, 150, and 160 transfer data among each other via crossbar 105. Each interconnect branch includes at least one branch connector circuit (BC) 107. Data transferred between devices 102 in different interconnect branches is transferred through at least one of the branch connector circuits 107 and crossbar 105. Crossbar 105 and each branch connector circuit 107 include circuitry to determine a transfer direction of the data being transferred to steer the data to appropriate destination within system 100. Crossbar 105 and interconnect branches 110, 120, 130, 140, 150, and 160 are configured to allow multiple devices 102 in at least two of the interconnect branches 110, 120, 130, 140, 150, and 160 to simultaneously transfer data among each other via crossbar 105. In some embodiments, crossbar 105 includes multiple connector circuits such as branch connector circuits 107 and transfer paths coupled to the connector circuits within crossbar 105 to transfer data among the interconnect branches 110, 120, 130, 140, 150, and 160. In other embodiments, crossbar 105 includes other configuration such as multi-master, multi-slave, and multi-bus configuration to transfer data among the interconnect branches 110, 120, 130, 140, 150, and 160.

As shown in system 100, at least one the interconnect branches 110, 120, 130, 140, 150, and 160 includes multiple branch connector circuits 107 coupled in a chain formation to form multiple pipelined stages. For example, interconnect branch 110 includes five branch connector circuits 107 forming multiple pipelined stages within interconnect branch 110 to pipeline (transfer) data. Since interconnect branch 110 is formed by multiple pipelined stages, interconnect branch 110 is also called a pipelined interconnection. Further, since interconnect branch 110 allows more than two devices 102 to transfer data with each other, interconnect branch 110 is also called a multi-drop pipelined interconnection. Each of the other interconnect branches 130, 140, 150, and 160 includes an arrangement similar to the arrangement of interconnect branch 110. Thus, each of the other interconnect branches 130, 140, 150, and 160 is also a multi-drop pipelined interconnection. Hence, the interconnect structure of system 100 includes a crossbar and multiple multi-drop pipelined interconnections to allow devices 102 to transfer data with each other.

In some embodiments, crossbar 105 is placed at a center location relatively centered to the locations of devices 102. Placing crossbar at the center location may improve the average speed of the transfer of data among interconnect branches 110, 120, 130, 140, 150, and 160.

Figure 2:
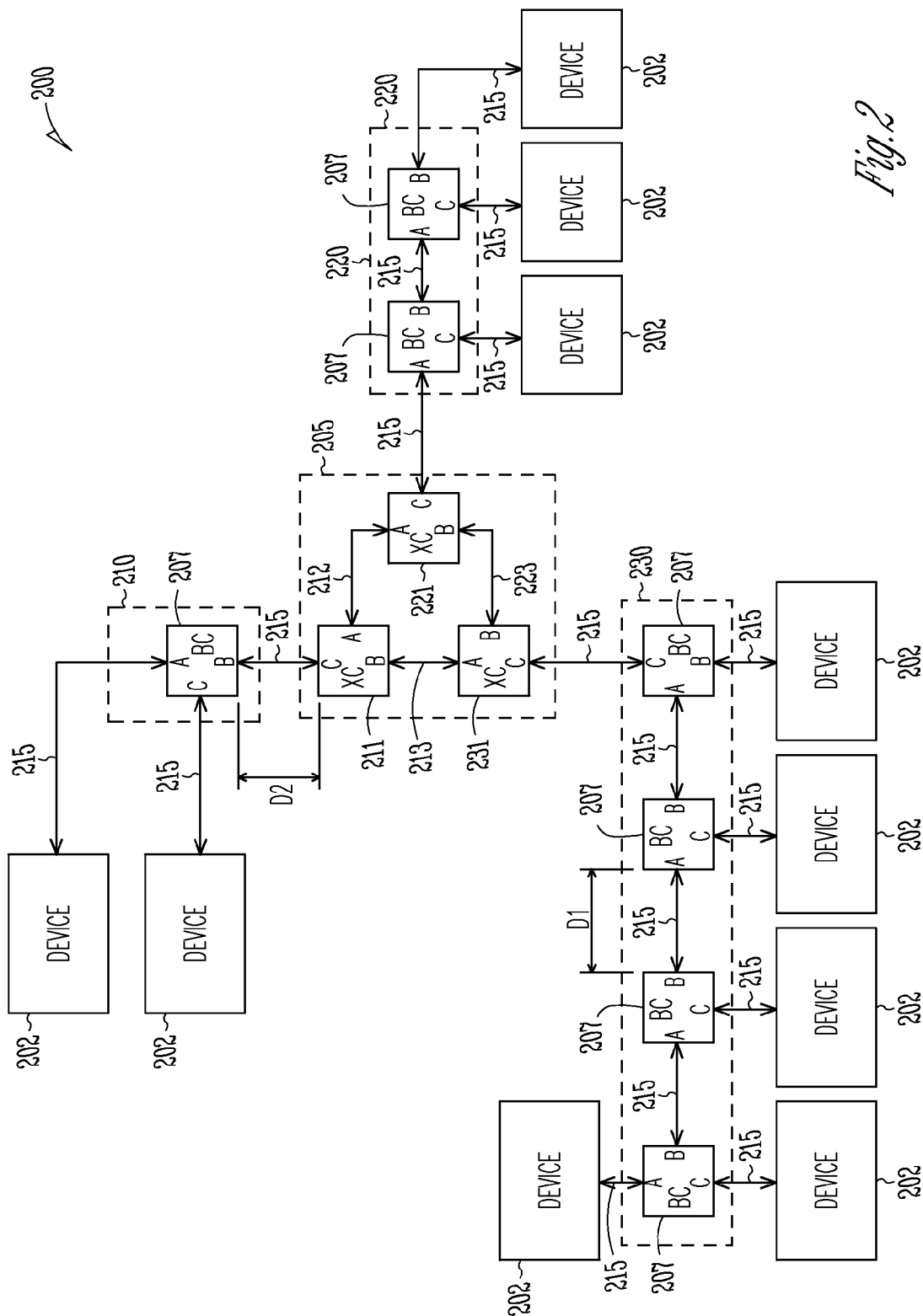
FIG. 2 shows a system having an interconnect structure with a crossbar and multiple interconnect branches according to an embodiment of the invention.

FIG. 2 shows a system having an interconnect structure with a crossbar and multiple interconnect branches according to an embodiment of the invention. In system 200, the interconnect structure includes a crossbar 205, interconnect branches 210, 220, and 230, and circuit interfaces 215 or interconnect segments 215. The interconnect structure allows a number of devices 202 to transfer data among each other. In some embodiments, crossbar 205 and branches 210, 220, and 230 are included a system represented by FIG. 1. In FIG. 2, at least one of the devices 202 includes an integrated circuit. In some embodiments, system 200 is formed on a single circuit chip.

In the embodiment represented by FIG. 2, crossbar 205 includes crossbar connector circuits (XC) 211, 221, and 231, and number of transfer paths or circuit interfaces 212, 213, and 223. Each of the transfer paths 212, 213, and 223 allows two crossbar connector circuits XC to transfer data with each other in both directions between the two crossbar connector circuits. For example, transfer path 212 allows data to be transferred in both directions: a first direction from crossbar connector circuit 211 to crossbar connector circuit 221, and a second direction from crossbar connector circuit 221 to crossbar connector circuit 211. Since each of the transfer paths 212, 213, and 223 allows data to be transferred in both directions between two crossbar connector circuits XC, each of the transfer paths 212, 213, and 223 is a bi-directional transfer path. In some embodiments, each of the transfer paths 212, 213, and 223 includes a first path to transfer data in one direction between two crossbar connector circuits and a second path separated from the first path to transfer data in another direction between the two crossbar connector circuits. In some embodiments, each of the first and second paths includes multiple lines to transfer multiple bits of data in parallel on the multiple lines.

In the embodiment represented by FIG. 2, crossbar connector circuits 211, 221, and 231, and transfer paths 212, 213, and 223 may be arranged in a ring formation to allow any two or more of the interconnect branches 210, 220, and 230 to transfer data with each other. In some embodiments, crossbar connector circuits 211, 221, and 231, and transfer paths 212, 213, and 223 may be arranged in formation different from the ring formation, for example, a linear formation. When data is transferred between different interconnect branches through crossbar 205, the data is transferred via at least one of the crossbar connector circuits 211, 221, and 231. Crossbar 205 is configured to allow multiple data transfers to be simultaneously transferred through at least one of the crossbar connector circuits 211, 221, and 231.

Each of the interconnect branches 210, 220, and 230 includes at least one branch connector circuit (BC) 207 coupled to at least one device 202. Each of the interconnect branches 210, 220, and 230 allows devices 202 within the same interconnect branch to transfer data among each other. A transfer of data among devices 202 in one interconnect branch is independent from a transfer of data among devices 202 in another interconnect branch.

As shown in FIG. 2, the interconnect structure of system 200 includes many interconnect segments (215). Each interconnect segment 215 connects between two branch connector circuits 207, between one branch connector circuits 207 and one device 102, or between one branch connector circuits 207 and crossbar 205. System 200 is configured to allow a transfer of data in any interconnect segment 215 to occur simultaneously with one or multiple transfers of data in the other interconnect segments 215. For example, a transfer of data on one or more interconnect segments 215 in interconnect branch 210 may occur simultaneously with a transfer of data on one or more interconnect segments 215 in interconnect branch 220. Further, the transfer of data on interconnect segments 215 is independent from each of other. Moreover, each interconnect segment 215 allows bi-directional or full duplex data transfer.

System 200 is also configured to allow a transfer of data between devices 202 in one combination of interconnect branches to occur simultaneously with a transfer of data between devices 202 in another combination of interconnect branches. For example, a transfer of data between devices 202 coupled to interconnect branches 210 and 220 may occur simultaneously with a transfer of data between devices 202 coupled to interconnect branches 220 and 230.

In the embodiment represented by FIG. 2, data includes data information, destination ID (identification), address information, and command information. Data information refers to data being written into or data read from memory (or other storage) locations of a component such as one of the devices in system 200. The data information being transferred is associated with a destination ID. The destination ID refers to a physical location of a component such as a physical location of one of the devices 202. Address information refers to memory locations in a component such as memory locations in the devices 102. Command information refers to commands associated with a transfer of one or more of the data information, destination ID, and address information. Examples of command information include status information, control information, request information, and transaction type such as read transaction and write transaction.

In the embodiment represented by FIG. 2, a message includes at least one of the information represented by the data. Thus, a message includes at least one of data information, destination ID, address information, and transaction information. In some embodiment, each of the data information, destination ID, address information, and command information includes one bit or multiple bits. Thus, in some embodiments, a message includes multiple bits representing at least one of data information, destination ID, address information, and command information. In some embodiments, a bit is represented by a signal having a binary value of binary one or binary zero.

In system 200, branch connector circuits 207 and crossbar connector circuits 211, 221, and 231 have a similar function and a similar circuit structure. Each of the crossbar connector circuits 211, 221, and 231 and branch connector circuits 207 includes multiple ports A, B, and C. Each connector circuit (XC or BC) receives a message at one of the ports A, B, and C and transfers the message to another connector circuit or to a device via another port. For example, when a connector circuit receives a message at port A, the connector circuit transfers the message from port A to either port B or port C. Subsequently, the connector circuit transfers the message from port B or port C to another connector circuit or to a device coupled to port B or port C.

Each of the crossbar connector circuits 211, 221, and 231 and branch connector circuits 207 is configured to transfer a message internally from any port (for example port A) to any other port (for example port B or port C) based on a transfer direction. Crossbar connector circuits 211, 221, and 231 and branch connector circuits 207 determine the transfer direction based on the destination ID associated with the message. Each of the devices 202 in system 200 is associated with a device ID. The destination ID corresponds to the device ID of one of the devices 202. In some embodiments, the destination ID associated with a message is generated by a device that originates the message. Crossbar connector circuits 211, 221, and 231 and branch connector circuits 207 transfer the message from the device that originates the message to a destination device that has a device ID matching the destination ID associated with the message.

The device ID of one device is different from a device ID of another device (i.e. unique). In some embodiments, the device ID is assigned during an initialization process of system 200. In some embodiments, the device ID's are assigned during chip design, construction, layout of system 200.

Embodiments exist where each crossbar connector circuit XC and each branch connector circuit BC is associated with a connector ID. In these embodiments, the destination ID of a message corresponds to one of the device ID, the connector ID of a crossbar connector circuit XC, and the connector ID of a branch connector circuit BC. Thus, embodiments exists where the destination of a message is one of a device 202, a crossbar connector circuit XC, and a branch connector circuit BC.

In FIG. 2, each of the D1 or D2 represents a connector distance. The connector distance is a distance between any two consecutive branch connector circuits 207 within the same interconnect branch, or a distance between any two consecutive crossbar connector circuits XC, or a distance between a crossbar connector circuit XC and a branch connector circuit 207 closest to the crossbar connector circuit XC. The connector distance has a value. In some embodiments, keeping the value of the connector distance less than or equal to a specific value allows an efficient transfer of data among devices 202 and enhances the performance of system 200. In some embodiments, the specific value is about two millimeters (2 mm).

In system 200, the specific value is not an obvious design choice. The specific value is chosen based on specific criteria, for example, operating frequency (speed) of system 200. In some embodiments, the specific value is chosen based on an operating frequency of at least two gigahertz ($2\times10^9$ hertz) such the data is transferred at a rate of at least two gigabits per second ($2\times10^9$ bits per second) on a single conductive line in system 200. Thus, in some embodiments, keeping the value of the connector distance (for example, D1 or D2) less than or equal to two millimeters allows efficient transfer of data among devices 102 and enhances the performance of system 200.

In some embodiments, when the specific value is chosen, the performance of system 200 is affected when the value of the connector distance is greater than the specific value. For example, when the specific value is about two millimeters, the speed of the transfer of the data, data accuracy, or a combination of both the speed of the transfer of the data and the data accuracy in system 200 is affected when the value of the connector distance (for example, D1 or D2) is greater than two millimeters. Embodiments exist where the connector distance is greater than two millimeters such that and appropriate operating frequency could be chosen to maintain signal and timing integrity.

In embodiments represented by FIG. 2, system 200 shows crossbar 205 including three crossbar connector circuits 211, 221, and 231 and three transfer paths 212, 213, and 223 as an example. In some embodiments, crossbar 205 includes a different number of crossbar connector circuits and a different number of transfer paths.

In system 200, since branch connector circuits 207 and crossbar connector circuits 211, 221, and 231 have a similar function and a similar circuit structure, a single circuit structure or circuit design may be reused for most or all of the branch connector circuits 207 and crossbar connector circuit 211, 221, and 231. Thus, in system 200, the interconnect structure formed by crossbar 205 and interconnect branches 210, 220, and 230 is a modular interconnect structure because a single circuit structure may be reused for all or most of the circuit connections among devices 102 to allow devices to transfer data among each other.

The modularity of the interconnect structure in system 200 may keep the number of interconnect lines in system 200 less than the number of interconnect lines of a system in a conventional circuit chip. In some cases, the number of interconnect lines in system 200 may be about 50% to 80% less than the number of interconnect lines of a system in a conventional circuit chip. Fewer number of interconnect lines may allow system 200 to have additional line-to-line spacing. Thus, congestion in circuit wiring in system 200 may be eliminated and coupling capacitance in the interconnect structure of system 200 may be reduced, leading to an improvement in performance of system 200.

The modularity of the interconnect structure of system 200 may also keep the size of the circuit chip containing system 200 smaller than the size of a conventional circuit chip leading to a lower production cost.

The modularity of the interconnect structure of system 200 may also simplify the construction or the circuit design of system 200.

The modularity of the interconnect structure of system 200 may also simplify the testability of system 200 by allowing a fewer number of testing circuit models to test all of the similar circuit connections among devices 202. The modularity may further allow a fixed common protocol for testing system 200.

The interconnect structure of system 200 may also have an aggregated bandwidth higher than that of a conventional shared bus. As shown in FIG. 2, the interconnect structure, the interconnect structure of system 200 includes multi-drop pipelined interconnections formed by multiple 3-port connector circuits such as the multiple 3-port connector circuits of interconnect branches 220 and 230. The multi-drop pipelined interconnections of system 200 allow both the number of interconnect segments 215 and the length of each interconnect segment 215 to be chosen such that a relatively high transfer rate is attainable on interconnect segments 215. In some embodiments, both the number of interconnect segments 215 and the length of each interconnect segment 215 are chosen such that the transfer rate of the interconnect structure of system 200 may be R times higher than the transfer rate of a conventional shared bus, where R is greater than one. Thus, for an equal number of lines of bus width, the aggregated bandwidth of interconnect structure of system 200 may be R times N (R×N) higher than the aggregated bandwidth of a conventional shared bus, where N is the number of interconnect segments 215. For example, if R=10 and N=30, then the aggregated bandwidth of the interconnect structure of system 200 is 300 (10×30) times higher than the aggregated bandwidth of the conventional shared bus.

Figure 3:
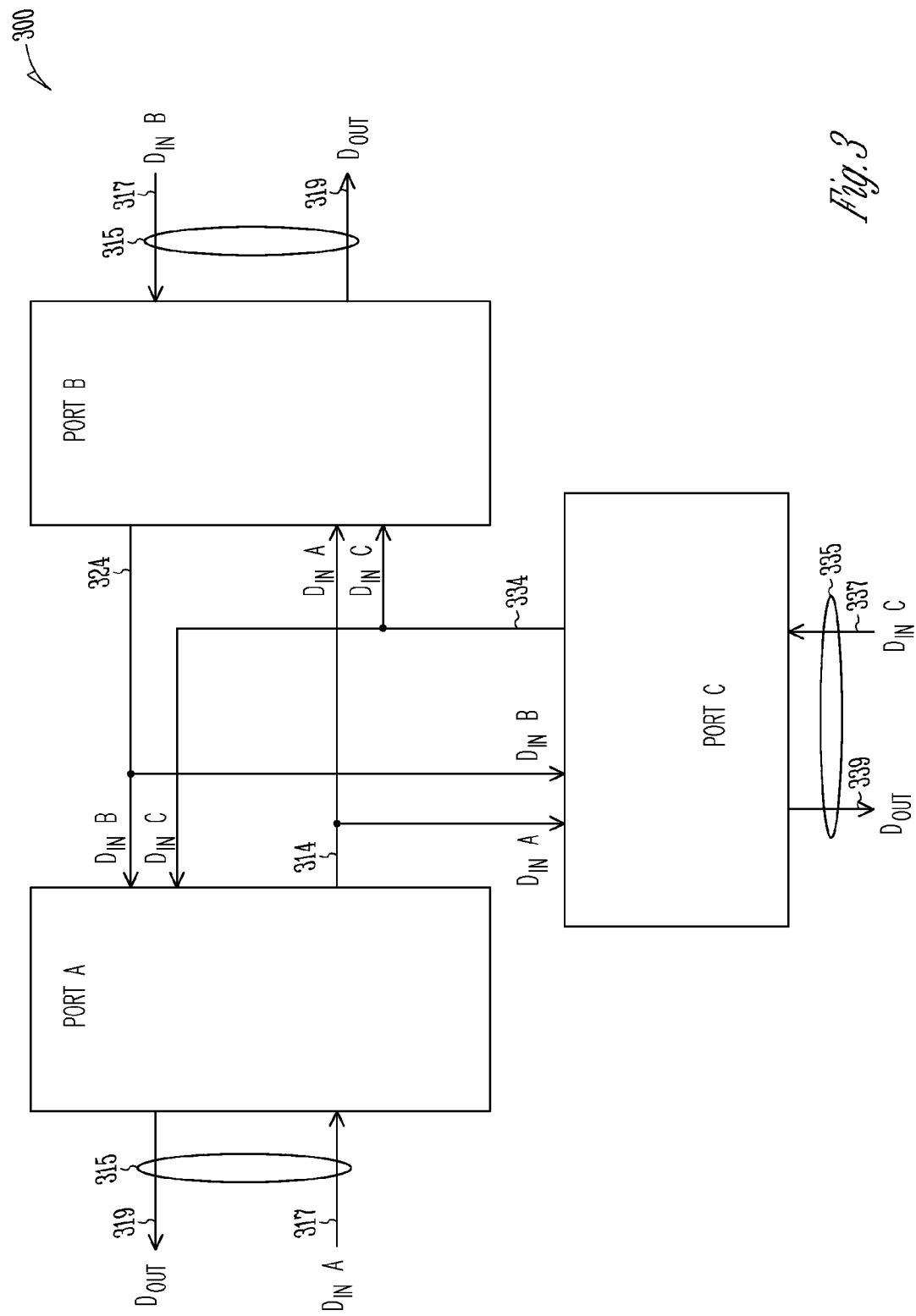
FIG. 3 shows a connector circuit having multiple ports according to an embodiment of the invention.

FIG. 3 shows a connector circuit with multiple ports according to an embodiment of the invention. In some embodiments, connector circuit 300 represents each of the crossbar connector circuit XC and branch connector circuit BC of FIG. 2. In FIG. 3, connector circuit 300 includes multiple ports A, B, and C, and multiple connector paths 314, 324, and 334 to allow ports A, B, and C to transfer data among each other. Each of the ports A, B, and C couples to one of the circuit interfaces 315, 325, and 335. Each of the circuit interfaces 315, 325, and 335 includes an input path (317, 327, or 337) to transfer $D_{IN}A$, $D_{IN}B$, or $D_{IN}C$, and an output path (319, 329, or 339) to transfer $D_{OUT}$. Each of the $D_{IN}A$, $D_{IN}B$, $D_{IN}C$, and $D_{OUT}$ represents a message.

$D_{IN}A$, $D_{IN}B$, or $D_{IN}C$ at a port represents a message received from a corresponding circuit interface. For example, $D_{IN}A$ at port A represents a message received from circuit interface 315. $D_{OUT}$ at a port represents one of the $D_{IN}A$, $D_{IN}B$, or $D_{IN}C$ sent by another port. For example, $D_{OUT}$ at port C represents either $D_{IN}A$ sent by port A or $D_{IN}B$ sent by port B.

Connector paths 314, 324, and 334 form multiple bi-direction connector paths to allow any one of the ports A, B, and C to transfer messages with any other port. Ports A, B, and C transfer messages independently from each other such that a transfer of a message on one of the connector paths 314, 324, and 334 is independent from a transfer of another message on another one of the connector paths 314, 324, and 334. Connector paths 314, 324, and 334 allow two or more different messages to be simultaneously transferred among ports A, B, and C within a time interval (or a transfer cycle). In some embodiments, the time interval is equal to one clock cycle of a clock signal used to transfer data in connector circuit 300. In other embodiments, the time interval is equal to multiple clock cycles of a clock signal used to transfer in connector circuit 300.

Connector circuit 300 is configured to receive $D_{IN}A$, $D_{IN}B$, and $D_{IN}C$ simultaneously at ports A, B, and C from circuit interfaces 315, 325 and 335 and to transfer the $D_{IN}A$, $D_{IN}B$, and $D_{IN}C$ out of connector circuit 300 as $D_{OUT}$ at each of the ports A, B, and C.

During a transfer of a message at each port, connector circuit 300 receives a message at one port from a circuit interface and internally transfers the message to one of the other two ports where the message is subsequently transferred out of connector circuit 300. For example, during a transfer of $D_{IN}A$, connector circuit 300 receives $D_{IN}A$ from circuit interface 315 and internally transfers $D_{IN}A$ to either port B or port C. From port B or port C, $D_{IN}A$ is subsequently transferred out of connector circuit 300 as $D_{OUT}$ at circuit interface 325 or 335.

Connector circuit 300 internally transfers a message from one port to another port based on a transfer direction determined by connector circuit 300 each time a message is received from one of the circuit interfaces 315, 325, and 335.

In connector circuit 300, two transfer directions exist from any one of the ports to the other two ports. For example, two transfer directions exist from port A to ports B and C: a first transfer direction from port A to port B and a second transfer direction from port A to port C. Thus, from one port (for example, port A), the transfer direction identifies which one of the two transfer directions to transfer the message to another port (port B or port C).

In FIG. 3, a message represented by each of the $D_{IN}A$, $D_{IN}B$, and $D_{IN}C$ is associated with a destination ID. Each of the ports A, B, and C is configured to determine the transfer direction of a message based on the destination ID associated with the message.

In some embodiments, each of the ports A, B, and C is configured to determine the transfer direction by comparing the destination ID with an ID code associated with connector circuit 300. In some embodiments, the ID code is stored in connector circuit 300. The ID code has a known value. In embodiments where connector circuit 300 represents the crossbar connector circuits XC and branch connector circuits BC of FIG. 2, the ID code is related to a device ID of a device such as device 102 (FIG. 1) or device 202 (FIG. 2). In FIG. 3, the comparison between the destination ID and the ID code produces a comparison result. In some embodiments, connector circuit 300 is configured to allow the comparison result to satisfy one of a first condition and a second condition. The comparison result specifies the transfer direction. For example, the transfer direction is the first direction when the first condition is satisfied; the transfer direction is second transfer direction when the second condition is satisfied.

In some embodiments, each of the ports A, B, and C is configured with a first configuration to allow the comparison result to satisfy the first condition if the destination ID is less than the ID code and to satisfy the second condition if the destination ID is greater than the ID code. Thus, in these embodiments, the transfer direction is the first transfer direction if the destination ID is less than the ID code; the transfer direction is second transfer direction if the destination ID is greater than the ID code.

In other embodiments, each of the ports A, B, and C is configured with a second configuration to allow the comparison result to satisfy the first condition if the destination ID and the ID code are matched (equal or identical) and to satisfy the second condition is satisfied if destination ID and the ID code are unmatched (unequal). Thus, in these embodiments, the transfer direction is the first transfer direction if the destination ID and the ID code are matched; the transfer direction is second transfer direction if destination ID and the ID code are unmatched.

In some other embodiments, ports A, B, and C have a mix of both the first configuration and the second configuration. For example, port A and port B may be configured with a first configuration to allow the comparison result to satisfy the first condition if the destination ID and the ID code are matched and to satisfy the second condition is satisfied if destination ID and the ID code are unmatched; and port C may be configured with a second configuration to allow the comparison result to satisfy the first condition if the destination ID is less than the ID code and to satisfy the second condition if the destination ID is greater than the ID code In further embodiments, each of the ports A, B, and C is configured to transfer messages to all other ports based on the destination ID associated with the message. For example, based on the destination ID associated with the message represented by $D_{IN}A$ on circuit interface 315, port A may transfer $D_{IN}A$ to both port B and port C.

Each of the ports A, B, and C is also configured to perform an arbitrating function. As mentioned previously, connector circuit 300 is configured to receive $D_{IN}A$, $D_{IN}B$, and $D_{IN}C$ simultaneously at ports A, B, and C from circuit interfaces 315, 325 and 335 and to transfer the $D_{IN}A$, $D_{IN}B$, and $D_{IN}C$ out of connector circuit 300 as $D_{OUT}$ at each of the ports A, B, and C. Thus, a situation exits where both a first message from first port and a second message from a second port are to be transferred out of connector circuit 300 through a third port. In this situation, the arbitrating function allows the third port to receive the first and second messages from the first and second ports based on a transfer order. The arbitrating function produces the transfer order.

In some embodiments, each of the ports A, B, and C performs the arbitrating function based on an arbitration algorithm. In some embodiments, each of the ports A, B, and C is assigned a priority. In some embodiments, messages may also contain a priority encoding; thus, more important messages may be given a higher arbitration priority than that of less important messages. In some of these embodiments, each of the ports A, B, and C is configured to perform the arbitrating function based on an arbitration algorithm such as a fixed priority, a weighted priority, or a combination of both fixed priority and a weighted priority.

In some embodiments, each of the input paths 317, 327, and 337, and output paths 319, 329, and 339 includes multiple lines for transfer multiple bits of data in parallel. Thus, in some embodiments, each of the $D_{IN}A$, $D_{IN}B$, $D_{IN}C$, and $D_{OUT}$ represents a message having multiple bits transferred in parallel in multiple lines in which each of the multiple bits is transferred on one separate line of the multiple lines.

In embodiments where connector circuit 300 represents each of the crossbar connector circuit XC and branch connector circuit BC of FIG. 2, ports A, B, and C of connector circuit 300 of FIG. 3 correspond to ports A, B, and C each of the crossbar connector circuit XC and branch connector circuit BC of FIG. 2; circuit interfaces 315, 325, and 335 correspond to circuit interfaces 215, or a combination of circuit interfaces 215, 212, 213, and 223.

Figure 4:
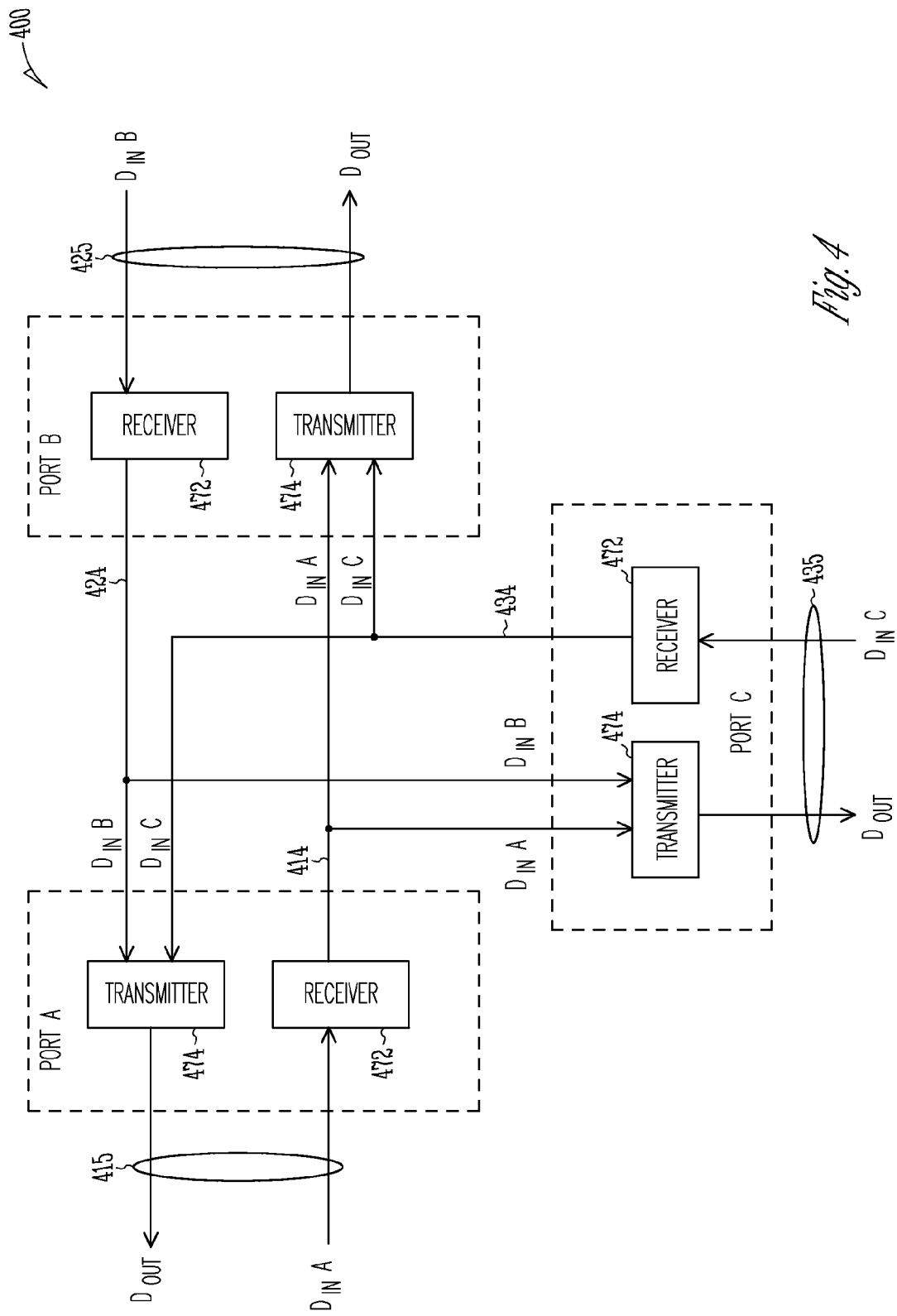
FIG. 4 shows a connector circuit with ports having transmitters and receivers according to an embodiment of the invention.

FIG. 4 shows a connector circuit with ports having transmitters and receivers according to an embodiment of the invention. In some embodiments, connector circuit 400 represents the connector circuits described in FIG. 1 through FIG. 3 such as crossbar connector circuit XC, branch connector circuit BC of FIG. 2, and connector circuit 300 of FIG. 3.

In FIG. 4, connector circuit 400 includes multiple ports A, B, and C, and multiple connector paths 414, 424, and 434 to allow ports A, B, and C to transfer data among each other. Each of the ports A, B, and C couples to one of the circuit interfaces 415, 425, and 435. Each of the circuit interfaces 415, 425, and 435 includes an input path 417, 427, or 437 to transfer $D_{IN}A$, $D_{IN}B$, or $D_{IN}C$, and output path 419, 429, or 439 to transfer $D_{OUT}$. Each of the $D_{IN}A$, $D_{IN}B$, $D_{IN}C$, and $D_{OUT}$ represents a message. $D_{IN}A$, $D_{IN}B$, or $D_{IN}C$ at a port represents a message received from the corresponding circuit interface. $D_{OUT}$ at a port represents one of the $D_{IN}A$, $D_{IN}B$, or $D_{IN}C$ sent by another port.

Connector paths 414, 424, and 434 form multiple bi-direction paths to allow any one of the ports A, B, and C to transfer messages with any other port. Ports A, B, and C transfer messages independently from each other such that a transfer of a message on one of the connector paths 414, 424, and 434 is independent from a transfer of another message on another one of the connector paths 414, 424, and 434. Connector paths 414, 424, and 434 allow at least two different messages to be simultaneously transferred among ports A, B, and C. For example, a transfer of $D_{IN}A$ from port A to port B may occur simultaneously with a transfer of $D_{IN}B$ from port B to port C. As another example, a transfer of $D_{IN}A$ from port A to port B may occur simultaneously with a transfer of $D_{IN}B$ from port B to port A.

Each of the ports A, B, and C includes a receiver 472 and a transmitter 474. Receivers 472 of port A, B, and C receive messages $D_{IN}A$, $D_{IN}B$, and $D_{IN}C$ from circuit interfaces 415, 425, and 435 independent from each other. Transmitters 474 transfer $D_{OUT}$ to circuit interfaces circuit interfaces 415, 425, and 435 independently from each other. Thus, a situation exist where receivers 472 of ports A, B, and C receive messages $D_{IN}A$, $D_{IN}B$, and $D_{IN}C$ simultaneously, one message at each port; and transmitters 474 transfer $D_{OUT}$ simultaneously to circuit interfaces circuit interfaces 415, 425, and 435, one $D_{OUT}$ to each circuit interface.

Receiver 472 of each of the ports A, B, and C receives a message represented by $D_{IN}A$, $D_{IN}B$, or $D_{IN}C$ from a corresponding circuit interface and transfers the message to transmitter 474 of either one of the other ports based on a transfer direction. For example, receiver 472 of port A receives $D_{IN}A$ from the corresponding circuit interface 415 and transfers $D_{IN}A$ to transmitter 474 of either port B or port C based on a transfer direction. Each of the $D_{IN}A$, $D_{IN}B$, and $D_{IN}C$ is associated with a destination ID.

Receiver 472 of each of the ports A, B, and C is configured to determine the transfer direction of a message represented by $D_{IN}A$, $D_{IN}B$, or $D_{IN}C$ based on the destination ID associated with the message. Two transfer directions exist from receiver 472 of one port to transmitters 474 of the other two ports. For example, two transfer directions exist from receiver 472 of port A to transmitters 474 of port B and port C: a first transfer direction from receiver 472 of port A to transmitter 474 of port B and a second transfer direction from receiver 472 of port A to transmitter 474 of port C. Receiver 472 of each of the ports A, B, C transfers a message to transmitter 474 of another port based on the transfer direction.

Thus, from each receiver 472, the transfer direction identifies which one of the two transfer directions to transfer the message to transmitter 474 of another port.

In some embodiments, receiver 472 of each of the ports A, B, and C is configured to determine the transfer direction by comparing the destination ID with an ID code associated with connector circuit 400. In some embodiments, the ID code is stored in connector circuit 400. The ID code has a known value. In some embodiments, connector circuit 300 is configured to allow the comparison result, produced from the comparison between the destination ID and the ID code, to satisfy one of a first condition and a second condition. The comparison result specifies the transfer direction. The transfer direction is the first direction when the first condition is satisfied. The transfer direction is the second transfer direction when the second condition is satisfied.

In some embodiments, receiver 472 of each of the ports A, B, and C is configured to allow the comparison result to satisfy the first condition if the destination ID is less than the ID code and to satisfy the second condition if the destination ID is greater than the ID code. In other embodiments, receiver 472 of each of the ports A, B, and C is configured to allow the comparison result to satisfy the first condition if the destination ID and the ID code are matched and to satisfy the second condition is satisfied if destination ID and the ID code are unmatched.

Transmitter 474 of a port receives a message $D_{IN}A$, $D_{IN}B$, or $D_{IN}C$ from receiver 472 of either one of the other two ports and transfers the message ($D_{IN}A$, $D_{IN}B$, or $D_{IN}C$) to a corresponding circuit interface as $D_{OUT}$. For example, transmitter 474 of port C receives either $D_{IN}A$ from receiver 472 of port A or $D_{IN}B$ from receiver 472 of port B and transfers $D_{IN}A$ or $D_{IN}B$ to circuit interface 435; $D_{OUT}$ at circuit interface 435 represents either $D_{IN}A$ or $D_{IN}B$.

Transmitter 474 of each of the ports A, B, and C is configured to perform an arbitrating function. A situation exits where receiver 472 of a first port (for example, port A) and receiver 472 of a second (for example, port B) simultaneously request to send a message to transmitter 474 of a third port (port C). In this situation, the arbitrating function allows receiver 472 of each of the first and second ports to send a message to transmitter 474 of the third port based on a transfer order. The arbitrating function produces the transfer order.

In some embodiments, transmitter 474 of each of the ports A, B, and C performs the arbitrating function to produce the transfer order based on an arbitration algorithm. In some embodiments, each of the ports A, B, and C is assigned a priority. In some of these embodiments, transmitter 474 of each of the ports A, B, and C is configured to perform the arbitrating function based on an arbitration algorithm such as a fixed priority, a rotational priority, or a combination of both fixed priority and a rotational priority.

In some embodiments, each of the input paths 417, 427, and 437 includes multiple lines for transfer multiple bits in parallel; and each the output paths 419, 429, and 439 includes multiple lines for transfer multiple bits of data in parallel. Thus, in some embodiments, each of the $D_{IN}$ and $D_{OUT}$ represents a message having multiple bits transferred in parallel in multiple lines in which each of the multiple bits is transferred one separate line of the multiple lines.

In embodiments where connector circuit 400 represents the connector circuits described in FIG. 1 through FIG. 3, ports A, B, and C of connector circuit 400 correspond to ports A, B, and C the connector circuits described in FIG. 1 through FIG. 3.

In the embodiment represented by FIG. 4, the arrangement of the circuit blocks such as receivers 472 and transmitters 474 represents an exemplary arrangement. Those skilled in the art will recognize that other arrangements of the circuit blocks of connector circuit 400 are possible without departing from the scope of the embodiments of the invention.

Figure 5:
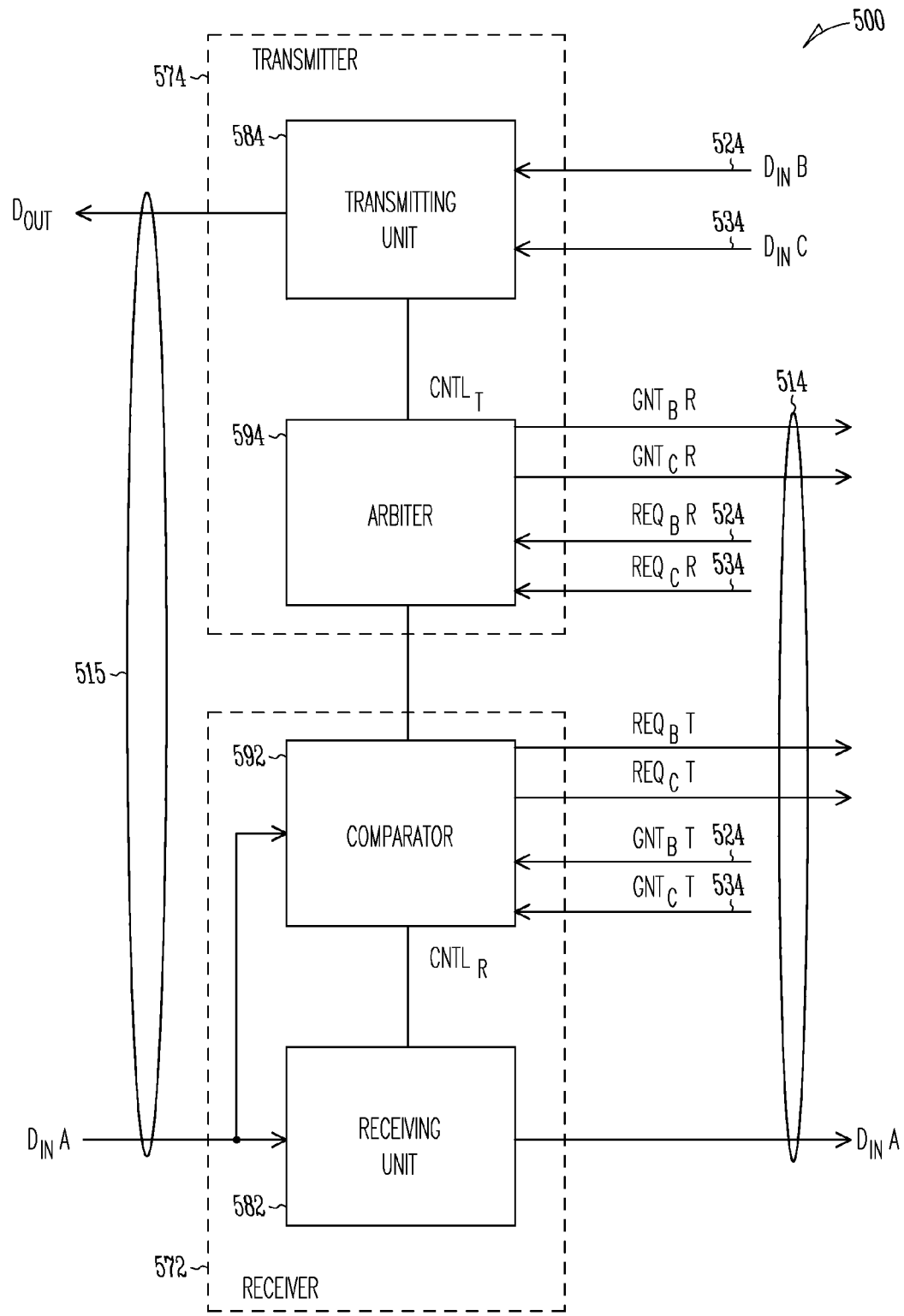
FIG. 5 shows a port according to an embodiment of the invention.

FIG. 5 shows a port according to an embodiment of the invention. In some embodiments, port 500 represents each of the ports A, C, and C of a connector circuits described in FIG. 1 through FIG. 4. In FIG. 5, port 500 includes a receiver 572 and a transmitter 574. Receiver 572 transfers a message represented by $D_{IN}A$ from a circuit interface 515 to a connector path 514. Transmitter 574 transfers messages represented by $D_{IN}B$ or $D_{IN}C$ from connector paths 524 or 534 to circuit interface 515. $D_{OUT}$ at circuit interface 515 represents $D_{IN}B$ or $D_{IN}C$.

In some embodiments, circuit interface 515 corresponds to each of the circuit interfaces 215, 212, 213, and 223 of FIG. 2. In other embodiments, circuit interface 515 of FIG. 5 corresponds to each of the circuit interfaces 315, 325, and 335 of FIG. 4; and connector paths 514, 524, and 534 of FIG. 5 correspond to connector paths 314, 324, and 334 of FIG. 4. In some other embodiments, circuit interface 515 of FIG. 5 corresponds to each of the circuit interfaces 415, 425, and 435 of FIG. 4; and connector paths 514, 524, and 534 correspond to connector paths 414, 424, and 434 of FIG. 4.

In FIG. 5, connector paths 514, 524, and 534 further transfer command information including grant commands (signals) $GNT_BR$, $GNT_BR$, $GNT_BT$, and $GNT_BT$, and request command $REQ_BT$, $REQ_CT$, $REQ_BR$, and $REQ_CR$. Port 500 uses the command information to enable the transfer of $D_{IN}A$, $D_{IN}C$, $D_{IN}B$, and $D_{OUT}$.

In some embodiments, port 500 represents port A among ports A, B, and C of connector circuit 400 of FIG. 4. In these embodiments, the $GNT_BR$ and $GNT_BR$ signals represent command information sent from port 500 (port A) to the receivers of port B and port C. The $GNT_BT$ and $GNT_BT$ signals represent command information sent to port 500 from the transmitters of port B and port C. The $REQ_BT$ and $REQ_BT$ represent information sent from port 500 to the transmitters of port B and port C. The $REQ_BR$ and $REQ_CR$ represent command information sent to port 500 from the receivers of port B and port C.

Receiver 572 includes a receiving unit 582 and a comparator 592. Receiving unit 582 receives $D_{IN}A$ from circuit interface 515. $D_{IN}A$ is associated with a destination ID. Comparator 592 compares the destination ID with an ID code in comparator 592. Based on the comparison result, comparator 592 activates one of the request signals $REQ_BT$ and $REQ_CT$ to request for a permission to send $D_{IN}A$ to connector path 514. After one of the request signals $REQ_BT$ and $REQ_BT$ is activated, one of the grant signals $GNT_BT$ and $GNT_BT$ is activated.

In embodiments where port 500 represents port A among ports A, B, and C of connector circuit 400 of FIG. 4, the $GNT_BT$ or $GNT_BT$ signal is activated by a transmitter of another port such as transmitter 474 of port B or port C of FIG. 4. The activation of the $GNT_BT$ or $GNT_BT$ signal indicates that the transmitter of port B or port C is ready to receive $D_{IN}A$ from receiving unit 582 of port 500. After one of the grant signals $GNT_BT$ and $GNT_BT$ is activated, comparator 592 sets the value of the $CNTL_R$ signal to enable receiving unit 582 to send $D_{IN}A$ from receiving unit 582 to connector path 514. $D_{IN}A$ from connector path 514 is subsequently received by a transmitter of a port such port B or port C. For example, if the $GNT_BT$ signal is activated and $GNT_BT$ signal is inactivated (not activated), then port B receives $D_{IN}A$; port C is unable to receive $D_{IN}A$ because the $GNT_BT$ is inactivated.

In some embodiments, comparator 592 activates the $REQ_BT$ signal if the destination ID and the ID code are matched and activates the $REQ_BT$ signal if the destination ID and the ID code are unmatched. In other embodiments, comparator 592 activates the $REQ_BT$ signal if the destination ID is less than the ID code and activates $REQ_BT$ signal if the destination ID is greater than the ID code.

As discussed above, since a different activation of the signal between the $REQ_BT$ and $REQ_CT$ signals transfers a message to a different transmitter, the different activation of the $REQ_BT$ and $REQ_BT$ signals represents different transfer direction. For example, when port 500 represents port A of a connector circuit with multiple ports A, B, and C, the activation of the $REQ_BT$ signal represents a first transfer direction to send $D_{IN}A$ from port A to port B; the activation of the $REQ_CT$ signal represents a second transfer direction to send $D_{IN}A$ from port A to port C.

Transmitter 574 includes a transmitting unit 584 and an arbiter 594. Transmitter 574 receives $D_{IN}B$ from connector path 524 and $D_{IN}C$ from connector path 534 and transfers $D_{IN}B$ and $D_{IN}C$ to circuit interface 515 as $D_{OUT}$. Arbiter 594 provides control to transmitting unit 584 to transfer $D_{IN}B$ and $D_{IN}C$ based on request signals $REQ_BR$ and $REQ_CR$.

Arbiter 594 receives request signals $REQ_BR$ and $REQ_CR$. In embodiments where port 500 represents port A of connector circuit 400 of FIG. 4, the $REQ_BR$ or $REQ_CR$ signal is activated by a receiver such as receiver 472 of port B or port C of FIG. 4. The activation of the $REQ_BR$ or $REQ_CR$ signal indicates that the receiver of port B or port C requests a permission to send $D_{IN}B$ or $D_{IN}C$ to transmitter 574 via connector path 524 or 454. After the $REQ_BR$ or $REQ_CR$ signal is activated, arbiter 594 activates a corresponding grant signal (one of the grant signals $GNT_BR$ and $GNT_BR$) to indicate that transmitting unit 584 is ready to receive $D_{IN}B$ or $D_{IN}C$. For example, after the $REQ_BR$ signal activated, arbiter 594 activates the $GNT_BR$ signal to port B to indicate to port B that transmitting unit 584 of transmitter 574 is ready to receive $D_{IN}B$ from port B. Arbiter 594 sets the value of the $CNTL_T$ signal when the $GNT_BR$ or $GNT_BR$ is activated to allow transmitting unit 584 to receive $D_{IN}B$ or $D_{IN}C$ and to transfer $D_{IN}B$ or $D_{IN}C$ to circuit interface 515 as $D_{OUT}$. In some embodiments, the value of the $CNTL_T$ signal includes a binary value represented by at least one binary bit.

Arbiter 594 performs an arbitrating function when both of $REQ_BR$ and $REQ_CR$ signals are simultaneously activated. In embodiments where port 500 is used as port A in a connector circuit with multiple ports such as ports A, B, and C of FIG. 4, the simultaneous activation of the $REQ_BR$ and $REQ_CR$ signals indicates that the receivers such as receivers 472 of both port B and port C simultaneously request to send $D_{IN}B$ and $D_{IN}C$ to transmitter 574 of port A. In this situation, arbiter 594 performs the arbitrating function to allow the receivers of port B and port C to send $D_{IN}B$ and $D_{IN}C$ to transmitting unit 584 based on a transfer order. The arbitrating function produces the transfer order.

In some embodiments, arbiter 594 activates the $GNT_BR$ signal at a first time and activates the $GNT_BR$ at a second time when both of the $REQ_BR$ and $REQ_CR$ signals are simultaneously activated. In these embodiments, transmitting unit 584 transfers $D_{IN}B$ from line 524 to circuit interface 515 during the first time and transfers $D_{IN}C$ from line 534 to circuit interface 515 during the second time. At circuit interface 515, $D_{OUT}$ represents $D_{IN}B$ or $D_{IN}C$. In some embodiments, arbiter 594 activates the $GNT_BR$ signal before the $GNT_BR$ when both of the $REQ_BR$ and $REQ_CR$ signals are simultaneously activated. In other embodiments, arbiter 594 activates the $GNT_BR$ signal after the $GNT_BR$ when both of the $REQ_BR$ and $REQ_CR$ signals are simultaneously activated.

In FIG. 5, receiver 572 and transmitter 574 transfer messages independently from each other. Thus, in some embodiments, port 500 is useful to be included as a port of a multi-port connector circuit such as the connector circuits described in FIG. 1 though FIG. 5 to allow bi-directional transfer of messages independently among the multiple ports of the connector circuit.

Figure 6:
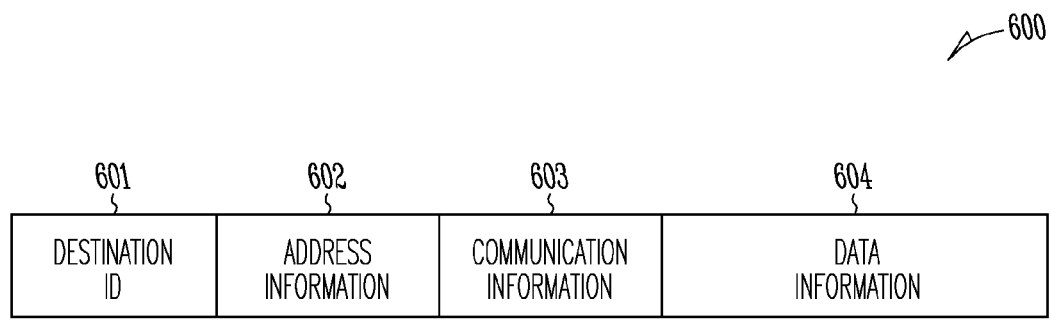
FIG. 6 shows an exemplary content of data according to an embodiment of the invention.

FIG. 6 shows an exemplary content of data according to an embodiment of the invention. Data 600 includes a plurality of data portions 601, 602, 603, and 604 carrying information such as destination ID; address information; command information; and data information. Each of the data portions 601, 602, 603, and 604 includes one or more bits. In some embodiments, data portion 601 includes at least 16 bits and data portion includes at least 96 bits.

In some embodiments, data 600 represents data or messages transferred in systems and circuits described in FIG. 1 through FIG. 5. In FIG. 6, at least one of the data portions 601, 602, 603, and 604 represents $D_{IN}A$, $D_{IN}B$, $D_{IN}C$, or $D_{OUT}$ of FIG. 2 through FIG. 4.

In some embodiments, data 600 represents a single message transferred in one time interval such that all of the destination ID, the address information, the command information, and the data information are transferred in parallel on multiple lines. In some embodiments, the time interval is equal to one clock cycle of a clock signal used to transfer data 600. In other embodiments, the time interval is equal to multiple clock cycles of a clock signal used to transfer data 600.

Embodiments exist where data 600 is divided into multiple messages such that each of the multiple messages includes at least one of the data portions 601, 602, 603, and 604. For example, embodiments exist where data 600 is divided into a first message and a second message in which the first messages includes data portions 602 and 603 and the second data portions 601 and 604.

In embodiments where data 600 is divided into multiple messages, the multiple messages are transferred in different time intervals. For example, when data 600 is divided into a first message and a second message, the first message is transferred in a first time interval and the second message is transferred in a second time interval. In some embodiments, each of the first and second time intervals is equal to one clock signal used to transfer the first and second messages. In other embodiments, at least one of the first and second time intervals is equal to multiple cycles of a clock signal used to transfer the first and second messages.

Figure 7:
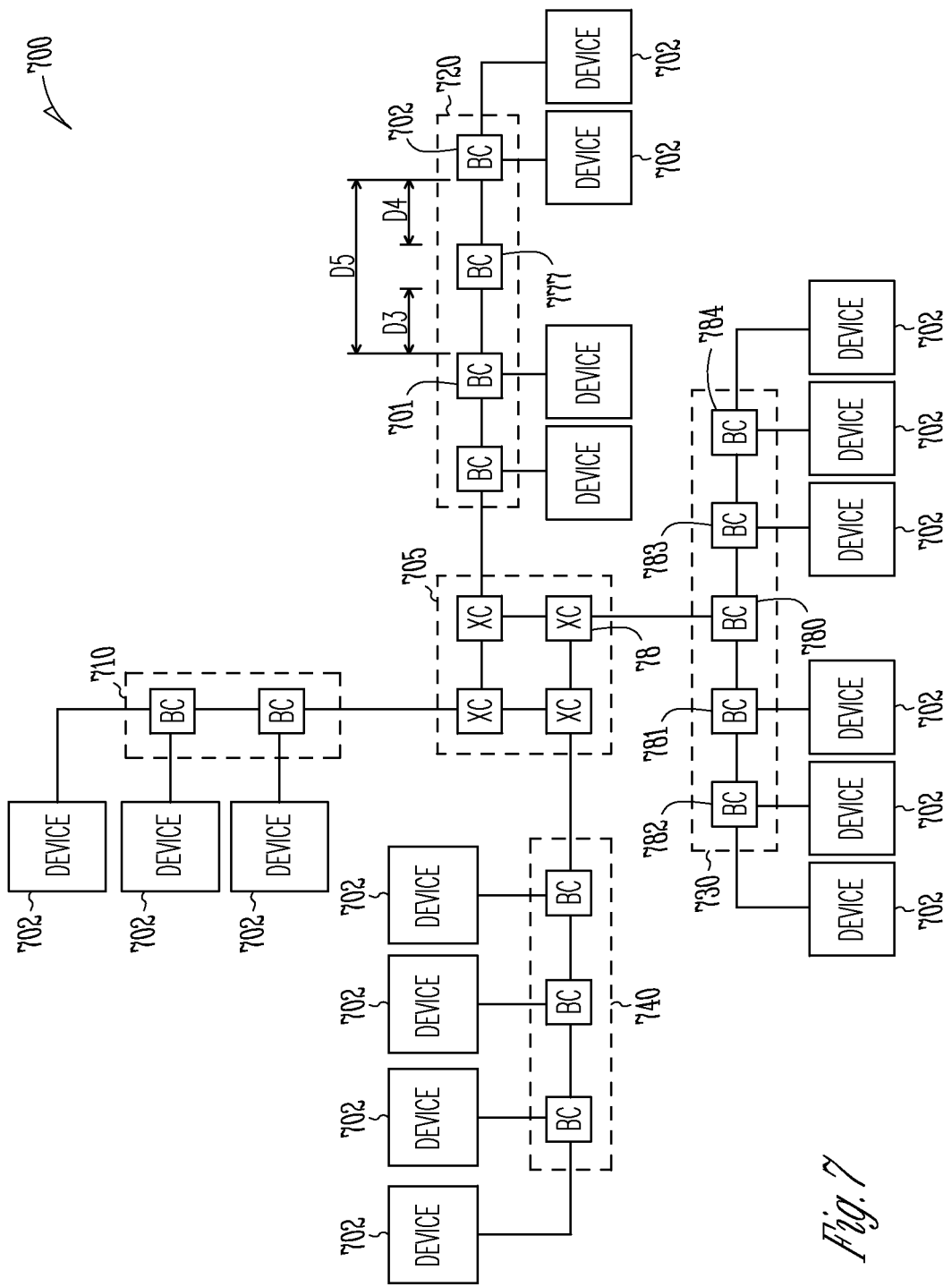
FIG. 7 shows a system having an interconnect structure with a repeater circuit and a divider circuit according to an embodiment of the invention.

FIG. 7 shows a system having an interconnect structure with a repeater circuit and a divider circuit according to an embodiment of the invention. System 700 includes an interconnect structure having a crossbar 705, and interconnect branches 710, 720, 730, and 740 to allow a number of devices 702 to transfer data among each other. Crossbar 705 includes a number of crossbar connector circuits (XC). Each of the interconnect branches 710, 720, 730, and 740 includes a number of branch connector circuits (BC). Embodiments of crossbar connector circuits (XC) and branch connector circuits (BC) in FIG. 7 include at least one of the embodiments described in FIG. 1 through FIG. 6. System 700 of FIG. 7 transfers data in fashion at least similar to the transfer of data in systems and circuits described in FIG. 1 through FIG. 6.

Branch connector circuit 777 represents a repeater circuit of system 700. As shown in FIG. 7, branch connector circuit 777 does not couple directly to any one of the devices 702. Thus, branch connector circuit 777 does not transfer data directly with any one of the devices 702. Branch connector circuit 777 coupled between branch connector circuits 707 and 708 to transfer data between two adjacent branch connector circuits 707 and 708.

D5 in FIG. 7 is a distance between branch connector circuits 707 and 708. Branch connector circuit 777 introduces D3 and D4 within D5. Each of the D3 and D4 represents a connector distance. As discussed previously in FIG. 2, a connector distance is a distance between any two consecutive branch connector circuits of the same interconnect branch. In some embodiments, D5 is greater than a specific value causing the transfer of data in system 700 to suffer. In these embodiments, a repeater circuit such as branch connector circuit 777 is inserted between branch connector circuits 707 and 708 to introduce D3 and D4 within D5 such that each of the D3 and D4 is less than or equal to the specific value. In some embodiments, keeping the value of the connector distance such as D3 or D4 less than or equal to the specific value allows an efficient transfer of data and enhances the performance of the system.

In embodiments represented by FIG. 7, branch connector circuits 777 (repeater circuit 777) is located between two branch connector circuits. In other embodiments, repeater circuit 777 is located between two crossbar connector circuits XC to allow the connector distance between the two crossbar connector circuits XC to be less than or equal to a specific value. In other embodiments, repeater circuit 777 is located between a crossbar connector circuit XC and a branch connector circuits BC to allow the connector distance between the crossbar connector circuit XC to be less than or equal to a specific value.

Branch connector circuit 780 in FIG. 7 represents a divider circuit of system 700. Branch connector circuit 780 does not couple directly to any one of the devices 702. Thus, branch connector circuit 780 does not transfer data directly with any one of the devices 702. Branch connector circuit 780 is coupled directly to three connector circuits including one branch connector circuit 78 and two branch connector circuits 781 and 783. In system 700, each device 702 is associated with a device ID based on an address map of system 700. Branch connector circuit 780 divides an address space in the address map into different address segments representing different device IDs (identifications). In some embodiments, the different address segments include a high address segment and a low address segment. For example, branch connector circuit 780 may divide the address space in the address map of system 700 into different address segments such that each of the devices 702 coupled to branch connector circuits 781 and 782 have a device ID lower than the device ID of each of the devices 702 coupled to branch connector circuits 783 and 784.

Figure 8:
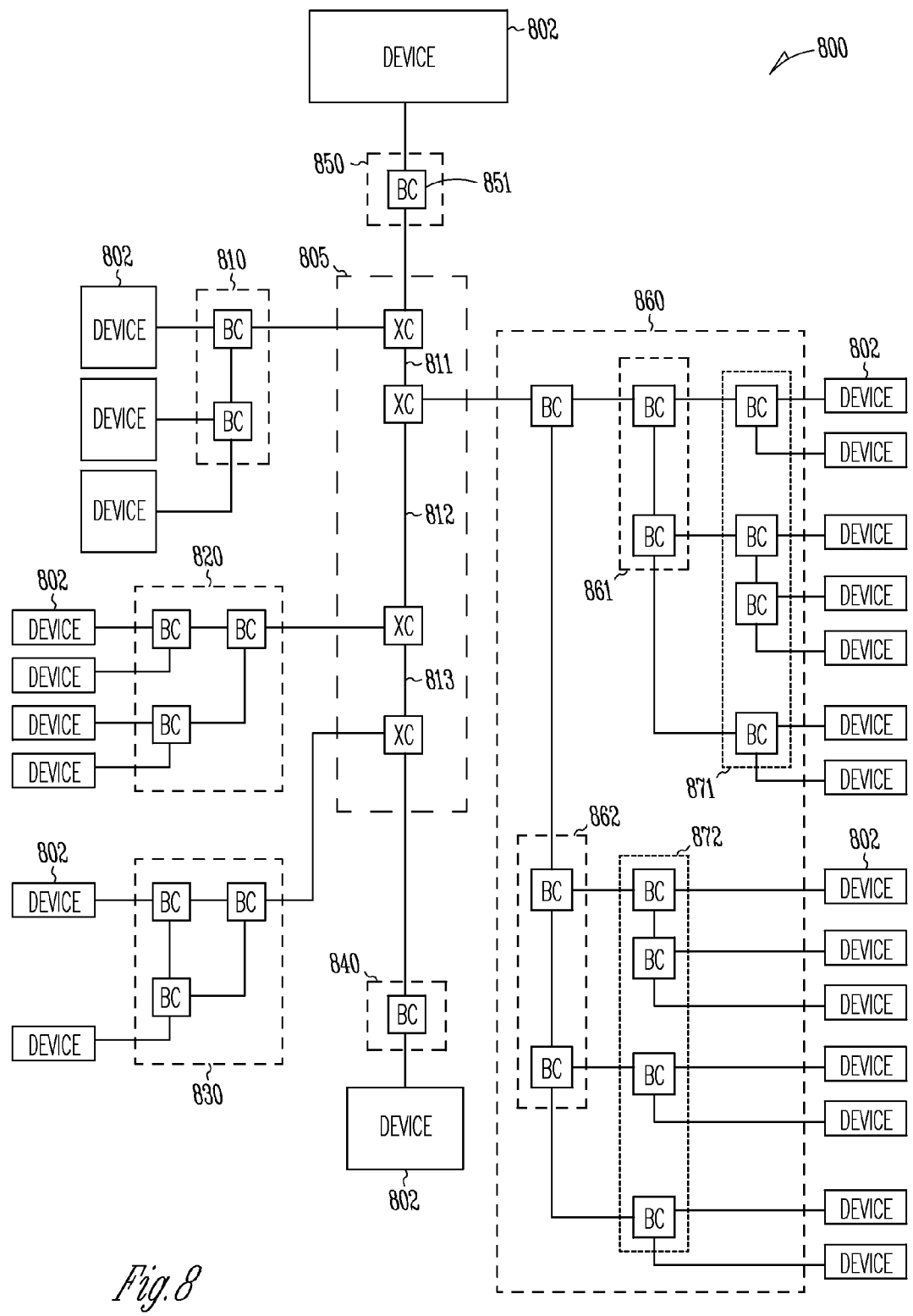
FIG. 8 shows a system having an interconnect structure with an alternative crossbar and multiple interconnect branches according to an embodiment of the invention.

FIG. 8 shows a system having an interconnect structure with an alternative crossbar and multiple interconnect branches according to an embodiment of the invention. System 800 includes an interconnect structure having a crossbar 805, and interconnect branches 810, 820, 830, 840, 850, and 860 to allow a number of devices 802 to transfer data among each other. Crossbar 805 includes a number of crossbar connector circuits (XC) and a number of transfer paths 811, 812, and 813. As shown in FIG. 8, the number of transfer paths (three) is one less than the number of crossbar connector circuits (four XC). In system 800 the crossbar connector circuits (XC) and transfer paths 811, 812, and 813 are arranged in a linear configuration.

Each of the interconnect branches 810, 820, 830, 840, 850, and 860 includes at least one branch connector circuits (BC). As shown in FIG. 8, system 800 includes an interconnect branch having a single branch connector circuit BC coupled to a single device 802. For example, interconnect branch 850 includes a single branch connector circuit 851 coupled to a single device 802.

Further, one or more interconnect branches of system 800 may include a combination of sub-branches such as nets and sub-nets. For example, interconnect branch 860 include nets 861 and 862, and sub-net 871 and 872. Moreover, one or more interconnect branches of system 800 may also include an arrangement such as a ring-net. For example, interconnect branch 830 includes a ring-net formed by three connector circuits BC. The nets, sub-nets, ring-net shown in FIG. 8 include exemplary groups or arrangements of connector circuits. Those skilled in the art will recognize that other groupings or arrangements of interconnect branches and connector circuits are possible without departing from the scope of the embodiments of the invention.

Embodiments of crossbar connector circuits (XC) and branch connector circuits (BC) in FIG. 8 include at least one of the embodiments described in FIG. 1 through FIG. 7. System 800 of FIG. 8 transfers data in fashion at least similar to the transfer of data in systems and circuits described in FIG. 1 through FIG. 7.

Figure 9:
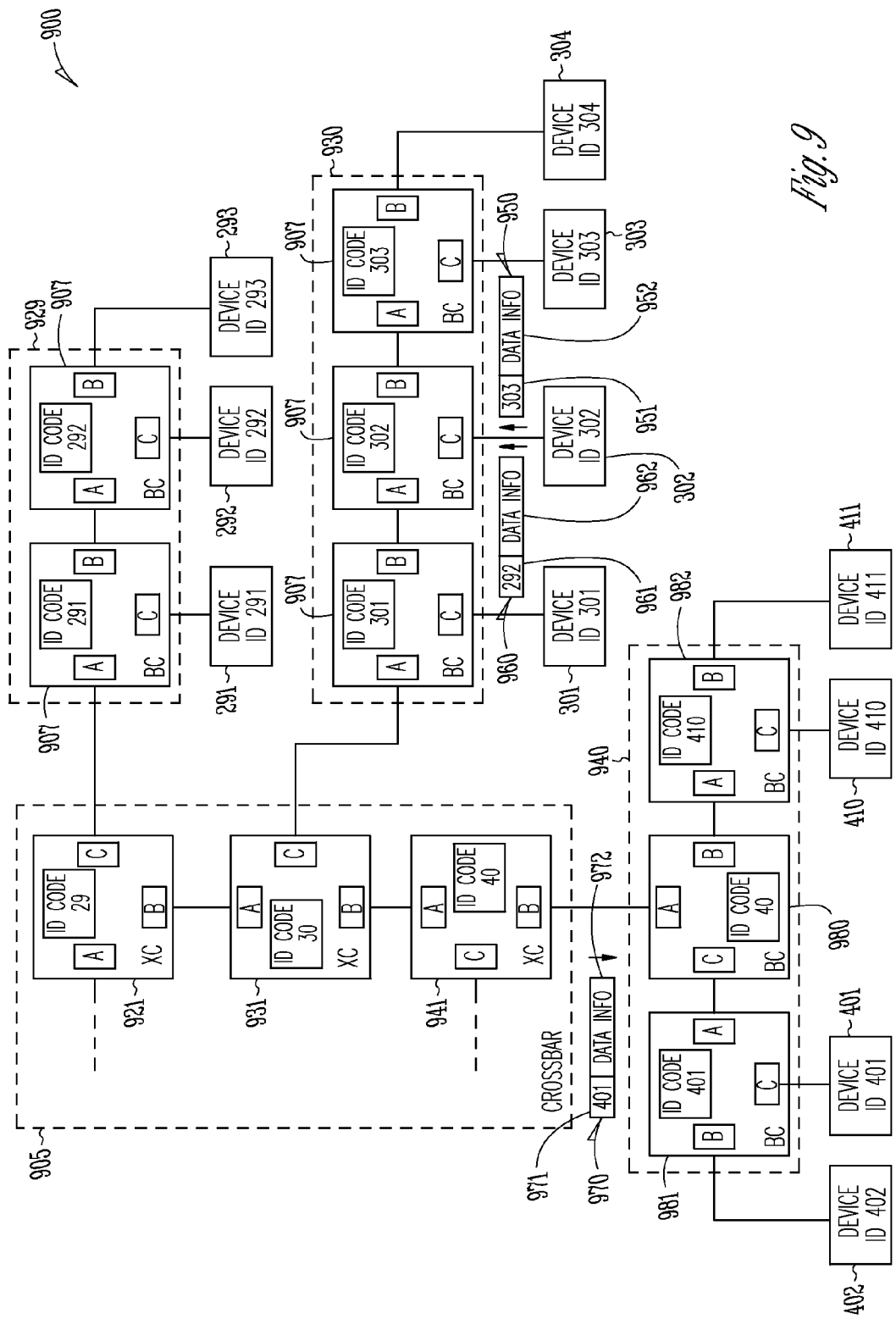
FIG. 9 shows a system having an interconnect structure with an exemplary address map according to an embodiment of the invention.

FIG. 9 shows a system having an interconnect structure with an exemplary address map according to an embodiment of the invention. System 900 includes an interconnect structure having a crossbar 905, and interconnect branches 929, 930, and 940. Crossbar 905 includes connector circuits (XC) 921, 931, and 941. Interconnect branches 929 and 930 include connector circuits (BC) 907. Interconnect branch 940 include connector circuits (BC) 980, 981, and 982. Embodiments of connector circuits 921, 931, 941, 907, 980, 981, and 982 in FIG. 9 include at least one of the embodiments described in FIG. 1 through FIG. 7.

System 900 is configured with an address map where each of the devices 291, 292, 293, 301, 302, 303, 304, 401, 402, 410, and 411 is assigned with an associated device ID (physical address). As an example, system 900 uses the reference number of a device as the device ID of the device. For example, the device ID of device 291 is 291, the device ID of device 292 is 292. Other device identifications (IDs) include 301, 302, 303, 304, 401, 402, 410, and 411.

Each connector circuit in system 900 is configured to store an ID code related to the device ID. In interconnect branches 929 and 930, each ID code is identical to a device ID of a device. For example, ID code 291 is identical to device ID of device 291; ID code 301 is identical to device ID of device 301.

Each connector circuit (XC) is configured to store an ID code such that the connector circuit (XC) transfers a message to the interconnect branch coupled directly to the connector circuit (XC) a when a match exists between the destination ID associated with the message and the ID code in the connector circuit (XC).

In interconnect branches 940, connector circuit 980 serves as an address divider circuit to divide the address space occupied by devices 401, 402, 410, and 411 into a first address segment and a second address segment. The first address segment includes device ID 401 and device ID 402. The second address segment includes device ID 410 and device ID 411.

The device ID and the ID code in FIG. 9 are represented by decimal numbers as an example. In some embodiments, the device ID and the ID code are represented by binary bits.

Each of the connector circuits in system 900 includes ports A, B, and C. In an exemplary configuration, within each of the connector circuits 907, 921, 931, and 941, port A is configured to transfer a message to port B if the destination ID and the ID code are unmatched and to port C if destination ID and the ID code are matched. Port B is configured to transfer a message to port A if the destination ID and the ID code are unmatched and to port C if destination ID and the ID code are matched. Port C is configured to transfer a message to port A if the destination ID is less than the ID code and to port B if the destination ID is greater than the ID code.

Within each of the connector circuits 980, 981, and 982, ports A, B, and C are configured in similar fashion among the ports such that a message is transferred among the port based on a match or a mismatch between the destination ID and the ID code. For example, port C is configured to transfer a message to port A if the destination ID and the ID code are unmatched and to port B if destination ID and the ID code are matched. Port A is configured to transfer a message to port B if the destination ID and the ID code are unmatched and to port C if the destination ID and the ID code are matched. Port B is configured to transfer a message to port A if the destination ID and the ID code are unmatched and to port C if destination ID and the ID code are matched.

System 900 is configured with an address map having both sequential address configuration and binary address configuration. The device IDs of each of the interconnect branches 929 and 930 are configured in with a sequential (or incremental) address configuration such as sequential addresses (device ID) 301, 302, 303, and 304. The device IDs of the devices in interconnect branches 940 are configured in with a binary address configuration such as binary address pair (device ID pair) 401 and 402, and address pair 410 and 411.

The following first example shows a transfer of a message between devices within the same interconnect branch. In this example, device 302 transfers a message 950 to device 303. In FIG. 9, message 950 includes a message portion 951 carrying a destination ID 303, and a message portion 952 carrying data information. Device 302 transfers message 950 to port C of the connector circuit having ID code 302. Port C compares the destination ID (which is 303) of message 950 with the ID code 302. Since the destination ID of message 950 is greater than ID code (303 is greater than 302), port C transfers message 950 to port B where message 950 is further transferred to port A of the connector circuit having ID code 303. Port A of the connector circuit having ID code 303 compares the destination ID of message 950 with the ID code 303. Since the destination ID 303 and the ID code 303 are matched, port A of the connector circuit having ID code 303 transfers message 950 to port C. Port C subsequently transfers message 950 to device 303. Thus, this example shows that a message is properly transferred between devices within the same interconnect branches based on the destination ID of the message.

The following second example shows a transfer of a message between different interconnect branches. In this example, device 302 transfers a message 960 to device 292. In FIG. 9, message 960 includes a message portion 961 carrying a destination ID 292, and a message portion 962 carrying data information. Device 302 transfers message 960 to port C of the connector circuit having ID code 302. Port C compare the destination ID (which is 292) of message 960 with the ID code 302. Since the destination ID of message 960 is less than ID code (292 is less than 302), port C transfers message 960 to port A where message 960 is transferred to port B of the connector circuit having ID code 301.

Port B of the connector circuit having ID code 301 compares the destination ID of message 960 with the ID code 293. Since the destination ID 292 and the ID code 303 are unmatched, port B of the connector circuit having ID code 301 transfers message 960 to port A. Port A subsequently transfers message 960 to port C of connector circuit 931 of crossbar 905.

Port C of connector circuit 931 compares a portion of the destination ID code with the ID code in connector circuit 921. In FIG. 9, port C of connector circuit 931 compares a portion represented by 29 (left most digits of 292) with ID code 30. Since the portion 29 of destination ID 292 is less than ID code 30, port C transfers message 960 to port A where message 960 is further transferred to port B of connector circuit 921. Port B of the connector circuit 921 compares the portion 29 of destination ID 292 with ID code 29 in connector circuit 921. Since the portion 29 of destination 292 and ID code 29 are matched, port A of connector circuit 921 transfers message 960 to port C where message 960 is further transferred to port A of connector circuit having ID code 291.

Port A of the connector circuit having ID code 291 compares the destination ID of message 960 with the ID code 291. Since the destination ID 292 and the ID code 291 are unmatched, port A of the connector circuit having ID code 291 transfers message 960 to port B where message 960 is further transferred to the connector circuit having ID code 292.

Port A of the connector circuit having ID code 292 compares the destination ID of message 960 with the ID code 292. Since the destination ID 292 and the ID code 292 are matched, port A of the connector circuit having ID code 291 transfers message 960 to port C. Port C subsequently transfers message 960 to device 292. Thus, this example shows that a message is properly transferred between different interconnect branches based on the destination ID of the message.

As described in the first and second examples above, each of the connector circuits 907 use one combination of the digits of the destination ID to compare with the ID code in each of the connector circuits 907, whereas each of the connector circuits 921, 931, and 941 uses another combination of the digits of destination ID to compare with the ID code in each of the each of the connector circuits 921, 931, and 941. For example, each of the connector circuits 907 uses all digits of the destination ID to compare with the ID code in each of the connector circuits 907, whereas each of the connector circuits 921, 931, and 941 uses less than all digits of destination ID to compare with the ID code in each of the each of the connector circuits 921, 931, and 941.

The following third example shows a transfer of a message to an interconnect branch having an address divider circuit such as connector circuit 980. In this example, a message 970 is transferred to interconnect branch 940. In some embodiments, message is 970 is originated by a device such as one of the devices 291, 292, 293, 301, 302, 303, and 304. Message 970 includes a message portion 971 carrying a destination ID 401 and a message portion 972 carrying data information.

When port A of connector circuit 980 receives message 970, port A compares the portion 40 of destination ID 401 with ID code 40 in connector circuit 980. Since the portion 40 of destination 401 and ID code 40 are matched, port A of connector circuit 980 transfers message 970 to port C. Port C subsequently transfers message 970 to port A of connector circuit 981.

Port A of connector circuit 981 compares the destination ID (401) of message 970 with the ID code 401 in connector circuit 981. Since the destination ID 401 and the ID code 401 are matched, port A of connector circuit 981 transfers message 970 to port C. Port C subsequently transfers message 970 to device 401. Thus, this example shows that a message is properly transferred in an interconnect branch having an address divider circuit.

The first, second, third examples above show transfers of messages in system 900 based on an exemplary address map shown in FIG. 9. Embodiments exits where the address map includes a configuration different from the configuration shown in FIG. 9. For example embodiments exist where each of the connector circuits is also assigned with an associated connector ID (physical connector address).

Figure 10:
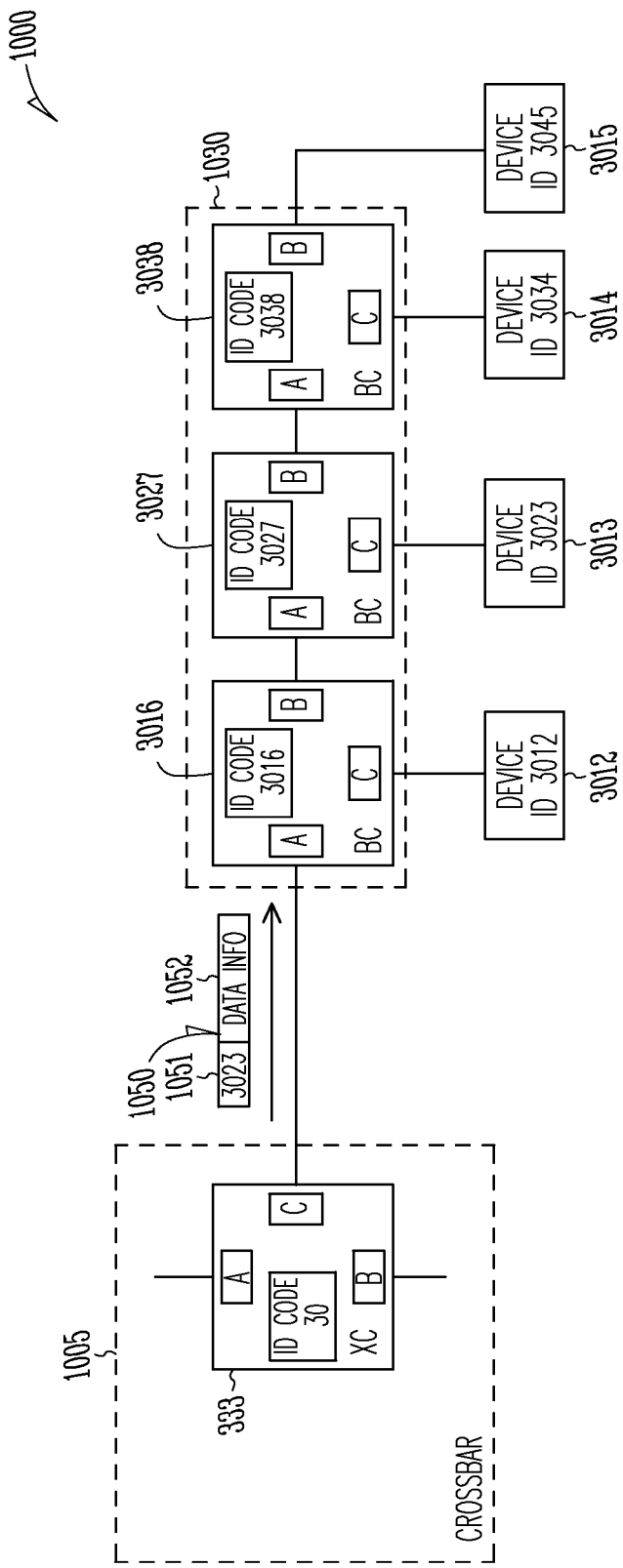
FIG. 10 shows a system having an interconnect structure with an exemplary address map including connector addresses according to an embodiment of the invention.

FIG. 10 shows a system having an interconnect structure with an exemplary address map including connector addresses according to an embodiment of the invention. In system 1000, the interconnect structure includes a crossbar 1005, and an interconnect branch 1030 having connector circuits 3016, 3027, and 3038. Interconnect branch 1030 couples to devices 3012, 3023, 3034, and 3045. As an example, system 100 show crossbar 1005 with one crossbar connector circuit 333 coupled to one interconnect branch. Embodiments exist where system 1000 includes multiple crossbar connector circuits and multiple interconnect branches at least similar to embodiments represented by FIG. 1 through FIG. 9.

System 1000 is configured with an address map where each of the devices 3012, 3023, 3034, and 3045 is assigned with an associated device ID (physical address), and each of the connector circuits 3016, 3027, and 3038 is also assigned with an associated connector ID (physical address).

As an example, in system 1000, the reference number of a device is also a device ID of the device. Thus, the device IDs in system 1000 are 3012, 3023, 3034, and 3045.

As an example, in system 1000, the reference number of a connector circuit is also a connector ID of the connector circuit. Thus, the connector IDs in system 1000 are 3016, 3027, and 3038. In FIG. 10, the ID code in a connector circuit represents the connector ID associated with the connector circuit.

In the embodiment represented by FIG. 10, the device IDs and the connector IDs are assigned with non-consecutive numbers to show an exemplary address map for the devices IDs and the connector IDs. In some embodiments, the device IDs and the connector IDs are assigned with consecutive or sequential numbers such that no gap exists among device IDs and no gap exists among the connector IDs.

In comparison a connector ID with a device ID in system 1000, the connector ID and the device ID are related such that a first portion of the connector ID and a first portion of the device ID are identical, and a second portion of the connector ID and a second portion of device ID are different. In the exemplary address map of FIG. 10, system 100 is configured such that the first portion of each of the connector ID and the device ID includes three digits (left most digits); the second portion of the connector ID and the device ID includes a single digit (right most digit). For example, connector ID 3016 and device ID 3012 have and identical first portion (301) and a different second portion (digit 6 versus digit 2).

System 1000 transfers a message though each of the ports A, B, and C in each connector circuit in a fashion similar to a transfer of a message through ports A, B, and C in systems and circuits described in FIG. 1 through FIG. 9. In FIG. 10, since each connector circuit is associated with a connector ID, each connector circuit may be a destination for a message such that the message may be transferred to components within a connector circuit itself instead of a device.

During a transfer of a message in system 1000, when the message is transferred to a connector circuit, the connect circuit compares the first portion (for example, three left most digits) of a destination ID associated with the message with the first portion of the ID code associated with the connector circuit. A match between the first portions indicates that the destination of the message is either the connector circuit itself or a device coupled to a port (for example, port C) of the connector circuit. The value of second portion of the destination ID indicates which of the connector circuit and the device is the destination of the message.

When the first portions of the destination ID and the ID code are unmatched, the connector circuit does not compare the second portion (for example, the right most digit) of the destination ID with the second portion of the connector ID of the connector circuit. The connector circuit transfers the message to an appropriate direction such as to another connector circuit in a transfer direction towards the destination indicated by the destination ID.

When the first portions of the destination ID and the ID code are matched, the connector circuit continues to compare the second portion of the destination ID with the second portion of the connector ID of the connector circuit. In some embodiments, a match between the second portions indicates that the destination of the message is the connector circuit itself. In this case, the message is transferred to components within the connector circuit. In contrast, a mismatch between the second portions indicates that the destination of the message is the device coupled to the connector circuit.

In the description above, system 1000 is configured such that when the first portions of the destination ID and the connector circuit are matched, the destination of the message is the connector circuit when value of second portion of the destination ID matches the value of the second portion of the connector circuit. In some embodiments, system 1000 is configured such that when the first portions of the destination ID and the connector circuit are matched, the destination of the message is the connector circuit when value of second portion of the destination ID is unmatched the value of the second portion of the connector circuit.

The following example shows a transfer of an exemplary message to device 3023. Message 1050 includes a destination ID 3023 and data information. In this example, connector circuit 3016 receives message 1050 from crossbar 1005. Connector circuit 3016 compares the first portion (302) of the destination ID with the first portion of the ID code (301) of connector circuit 3027. Since the first portions are unmatched, connector circuit 3016 transfers the message 1050 to connector circuit 3027. Connector circuit 3027 compares the first portion (302) of the destination ID with the first portion of the ID code (302) of connector circuit 3027. The first portions are matched in this case, indicating that the destination of message 1050 is either connector circuit 3027 or device 3023. Since the first portions are matched, connector circuit 3027 continues to compare the second portion (3) of the destination ID with the second portion of the ID code (connector ID) of connector circuit 3027. The second portions are unmatched in this example, indicating that the destination of message 1050 is device 3023. Connector circuit 3027 transfers message 1050 to device 3023. Thus, in this example, message 1050 is properly transferred to the destination, device 3023, as indicated by the destination ID 3023.

In embodiments represented by FIG. 10, in each of the connector ID and the device ID, the first portion includes three digits in the left most digit positions, the second portion includes one digit in the right most digit position. In some embodiments, in each of the connector ID and the device ID, each of the first and second portions may include any number of digits in any digit positions.

The device ID and the connector ID code in FIG. 10 are represented by decimal numbers as an example. In some embodiments, the device ID and the ID code are represented by binary bits and each of the first and second portions of each of the connector ID and the device ID includes one or more binary bits in any digit positions.

As mentioned above, system 1000 is configured with an address map where each of the devices 3012, 3023, 3034, and 3045 is assigned with an associated device ID (physical address), and each of the connector circuits 3016, 3027, and 3038 is also assigned with an associated connector ID (physical address). In some embodiments, system 1000 is configured with an address map such that for each connector and device pair, the device ID and the connector ID are the same (identical ID). The identical ID is presented by a number of binary bits. In these embodiments, a destination of a message is represented by a number of binary bits equaled to a number of binary bits representing the identical ID of the connector circuit and device pair plus a single extra binary bit. The value of the extra bit indicates which of the connector circuit and device in the pair is the destination of the message. For example, the destination of the message is the connector circuit when the value of the single extra binary bit is a binary one and the destination of the message is the device if the value of single extra binary bit is a binary zero. In FIG. 10, for example, if both the connector ID of connector circuit 3016 and the device ID of device 3012 is represented by the same binary bits 10001000 (eight binary bits) and if the destination ID of a message is 110001000 (nine binary bits), then the destination of the message is connector circuit 3016; if the destination of the message is 010001000 (the left most digit is 0 instead of 1), then the destination of the message is device 3012.

In embodiments where a single extra binary bit of the destination ID determines which of the connector circuit and device in the pair is the destination of the message, the ID code in the connect circuit of each circuit and device pair the represents the identical ID of the circuit and device pair. In this case, the entire ID code in the connector circuit represents the first portion of the connector ID comparable to the first portion of the connector ID discussed above. In these embodiments, since the entire ID code in the circuit of each connector and device circuit pair represents the identical ID, the connector circuit omits the comparison between the second portion of the destination ID and second portion of the ID code. Each connector circuit only compares the first portion of the destination ID with the entire ID code in the connector circuit and check for the value of the second portion (the single extra binary bit) of the destination ID to determine the destination of the message if the first portion of the destination ID and the ID code are matched.

Figure 11:
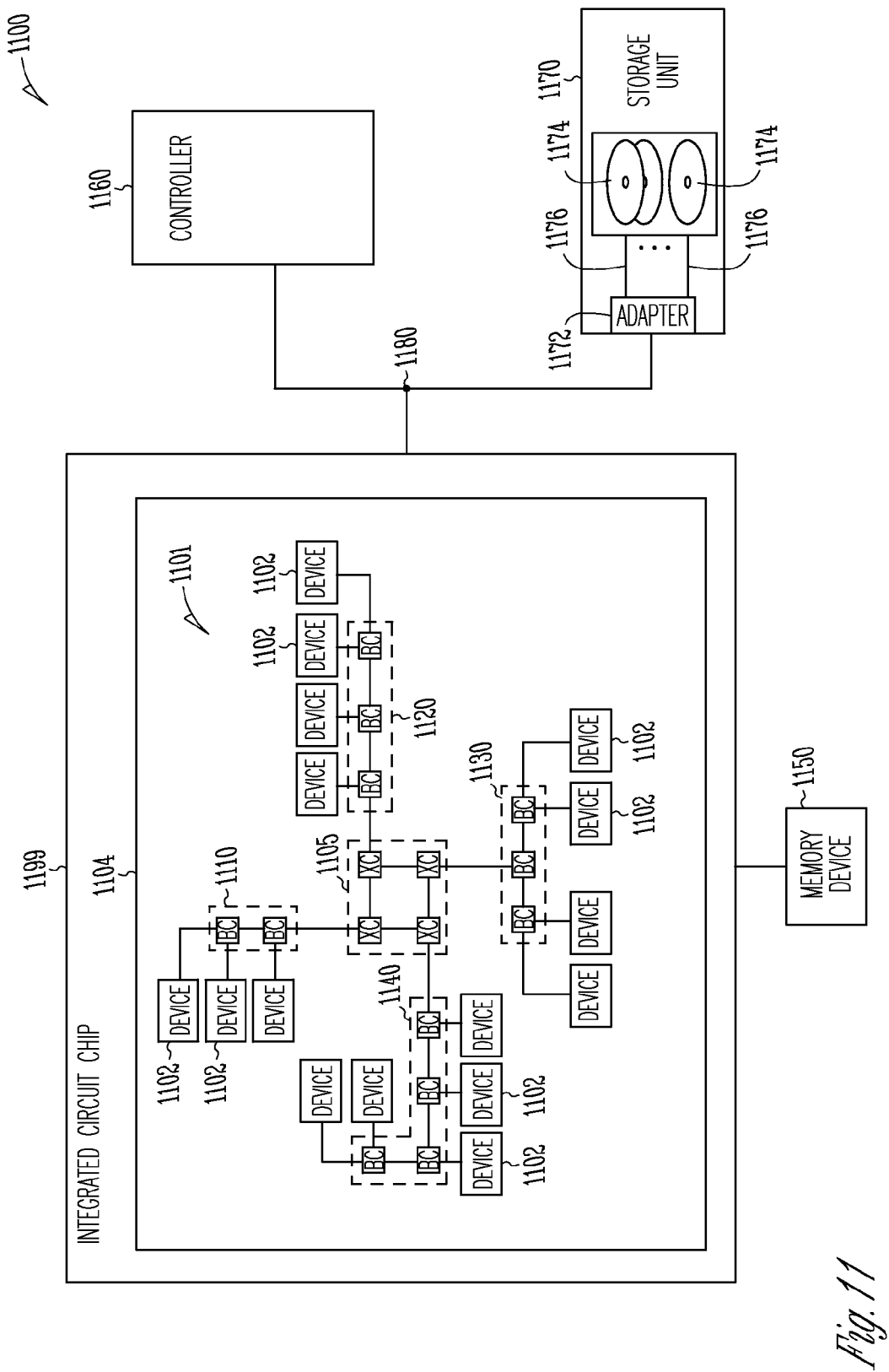
FIG. 11 shows a networking system including an integrated circuit chip according to an embodiment of the invention.

FIG. 11 shows a networking system including an integrated circuit chip according to an embodiment of the invention. Networking system 1100 includes an integrated circuit chip 1199, a memory device 1150, a controller 1160, a storage unit 1170, and a multi-drop interconnection 1180. In some embodiments, networking system 1100 is a storage area network in which controller 1160 includes a computer or a server.

Integrated circuit chip 1199 couples to controller 1160 and storage unit 1170 via an interconnection 1180 to transfer data to both controller 1160 and storage unit 1170.

In some embodiments, interconnection 1180 is a multi-drop interconnection.

In other embodiments, integrated circuit chip 1199 may be coupled to another circuit chip via a point-to-point interconnection in stead of via a multi-drop interconnection such as multi-drop interconnection 1180 of FIG. 11.

Memory device 1150 includes a medium to store data. In some embodiments, memory device 1150 includes a dynamic random access memory. In other embodiments, memory device 1150 includes a flash memory. In some other embodiments, memory device 1150 includes a combination of both dynamic random access memory and flash memory.

Storage unit 1170 includes an adapter 1172 coupled to a number of disks 1174 via a number of cables 1176. Disks 1172 store data. Adapter 1172 serves as a bridge between interconnection 1180 and cables 1176. In some embodiments, cables 1176 are fiber optic cables. In other embodiments, cables 1176 are small computer system interface (SCSI) cables. In some embodiments, adapter 1172 is located outside storage unit 1170.

In some embodiments, disks 1174 are configured as a redundant array of independent disks (RAID) to store data used in networking system 1100 including integrated circuit chip 1199.

In other embodiments, disks 1174 are configured as a so-called "just a bunch of disks" (or JBOD) configuration to store data used in networking system 1100 including integrated circuit chip 1199.

In some other embodiments, storage unit 1174 includes only a single disk instead of multiple disks 1174.

Integrated circuit chip 1199 includes a circuit die 1104, and a system 1101 formed on circuit die 1104. In some embodiments, circuit die 1104 includes semiconductor material such as silicon. System 1101 includes an interconnect structure having a crossbar 1105 and a number of interconnect branches 1110, 1120, 1130, and 1140 to transfer data among a number of devices 1102. In some embodiments, system 1101 includes at least one system described in FIG. 1 through FIG. 10. Thus, in some embodiments, system 1101 includes an interconnect structure having circuit structures and functions described in FIG. 1 through FIG. 10.

Figure 12:
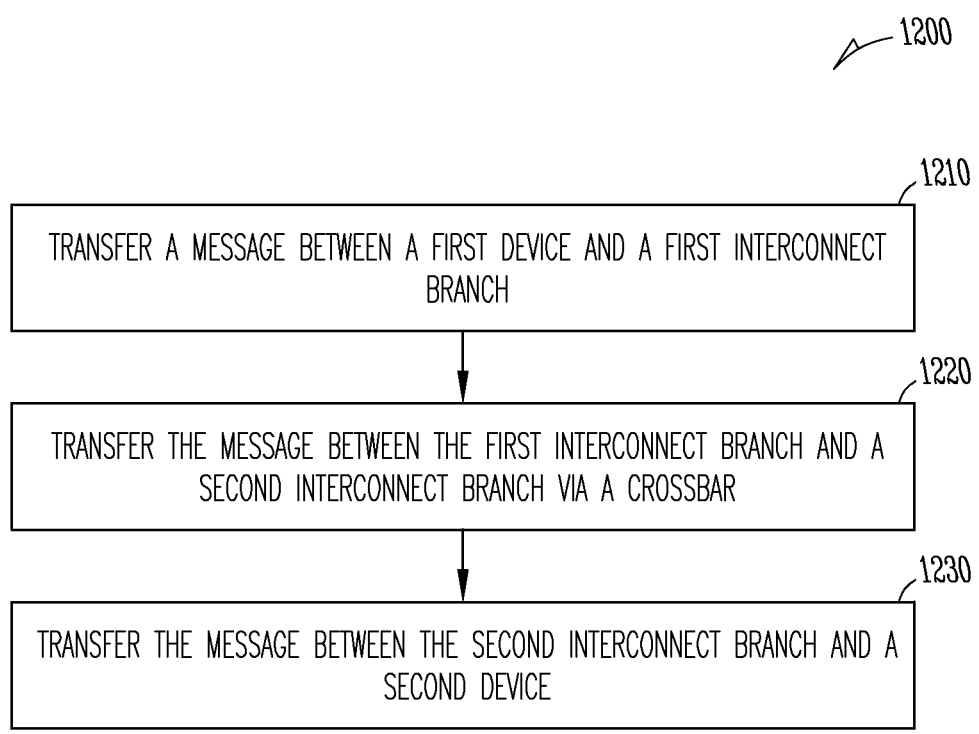
FIG. 12 shows a method of transferring data according to an embodiment of the invention.

FIG. 12 shows a method of transferring data according to some embodiments of the invention. Method 1200 transfers data among a number of devices via an interconnect structure in a system. In some embodiments, method 1200 is used in the systems and circuits described in FIG. 1 through FIG. 11. The interconnect structure in method 1200 includes a crossbar coupled to a plurality of interconnect branches. The interconnect branches transfer messages among each other via the crossbar. In some embodiments, the crossbar and the plurality of interconnect branches in method 1200 include the crossbar and the plurality of interconnect branches described in FIG. 1 through FIG. 10.

In method 1200, box 1210 transfers a message between a first device and a first interconnect branch. The message is associated with a destination ID. In the system used in method 1200, each device such as the first device has an associated device ID. The destination ID corresponds to a device ID of a second component or a device coupled to a second interconnect branch in the system. In box 1210, the message is transferred via at least one selected branch connector circuit among a plurality of branch connector circuits of the first interconnect branch. The selected branch connector circuit determines a transfer direction based on the destination ID to further transfer the message to the destination indicated by the destination ID. In some embodiments, the selected branch connector circuit determines the transfer direction by comparing the destination ID with an ID code stored in the selected branch connector circuit.

The ID code is related to a device ID of a device. In some embodiments, the ID code and the device ID are related such that the ID code and the device ID are identical. In other embodiments, the ID code and the device ID are related such that a first portion of the ID code and a first portion of the device ID are identical while a second portion of the ID code and a second portion of device ID are different.

In box 1210, after the selected branch connector circuit determines the transfer direction, the selected branch connector circuit transfers the message in the transfer direction towards the destination indicated by the destination ID. When the destination ID corresponds to device ID of a second device coupled to a second interconnect branch of the system, the selected branch connector circuit transfers the message in the transfer direction towards the second interconnect branch where the second device resides.

Box 1220 transfers the message between the first interconnect branch and a second interconnect branch via a crossbar. In box 1220, before the message is transferred to the second interconnect branch, the message is transferred from the first interconnect branch to the crossbar. After the crossbar receives the message, the crossbar also determines a transfer direction to further transfer the message to the destination indicated by the destination ID.

Box 1230 transfers the message between the second interconnect branch and a second device. After the second interconnect branch receives the message from the crossbar, the second interconnect branch transfers the message via at least one selected branch connector circuit among a plurality of branch connector circuits of the second interconnect branch. The selected branch connector circuit of the second interconnect branch also determines a transfer direction based on the destination ID to further transfer the message to the destination indicated by the destination ID. Based on the transfer direction, the message is subsequently transferred from the selected branch connector circuit of the second interconnect branch to the second device.

Method 1200 describes a transfer of a single message between a interconnect branch and a second interconnect branch via a crossbar, as an example. In some embodiments, method 500 transfers multiple messages between more than two interconnect branches via the crossbar. In some embodiments, method 1200 transfers the multiples messages simultaneously via the crossbar.

The above description of the embodiments represented by FIG. 1 through FIG. 12 is intended to be illustrative, and not restrictive. Many other embodiments will be apparent to those of skill in the art upon reading and understanding the above description. Therefore, the scope of various embodiments is determined by the appended claims, along with the full range of equivalents to which such claims are entitled.

What is claimed is:

1. An apparatus comprising:
a plurality of devices formed on an integrated circuit chip;
at least one crossbar formed on the integrated circuit chip; and
a plurality of interconnect blocks formed on the integrated circuit chip, each of the interconnect blocks coupled to at least one of the plurality of devices and to one of the at least one crossbar, each of the interconnect blocks having multiple ports including an ingress port formed on the integrated circuit chip and an egress port formed on the integrated circuit chip; and
wherein each of the at least one crossbar is located outside the plurality of interconnect blocks and coupled to one or more of the plurality of interconnect blocks to transfer information between a group of devices coupled to one of the plurality of interconnect blocks and another group of devices coupled to another one of the plurality of interconnect blocks via the crossbar, one of the at least one crossbar includes a first crossbar connector circuit, a second crossbar connector circuit, and a third crossbar connector circuit, a first transfer path to transfer information from the first crossbar connector circuit to the second and third crossbar connector circuits, a second transfer path to transfer information from the second crossbar connector circuit to the first and third crossbar connector circuits, and a third transfer path to transfer information from the third crossbar connector circuit to the first and second and third crossbar connector circuits, and wherein the information transferred via ingress ports and egress ports of the plurality of interconnect blocks, and wherein each of the first, second, and third crossbar connector circuits includes a first port, a second port, and a third port, the first port including a first transmitter, the first transmitter including a first arbiter to perform a first arbitrating function to receive messages from receivers of the second and third ports upon simultaneous activation based on a first transfer order, the second port including a second transmitter, the second transmitter including a second arbiter to perform a second arbitrating function to receive messages from receivers of the first and third ports upon simultaneous activation based on a second transfer order, and the third port including a third transmitter, the third transmitter including a third arbiter to perform a third arbitrating function to receive messages from receivers of the first and second ports upon simultaneous activation based on a third transfer order.

2. The apparatus of claim 1, wherein each of the multiple ports of each of the interconnect blocks is configured to determine a transfer direction based on an identification code associated with each of the interconnect blocks and a destination identification associated with the information to transfer the message from one of the multiple ports to another one of the multiple ports based on the transfer direction.

3. The apparatus of claim 1, wherein one of the at least one crossbar further includes a number of transfer paths coupled to the crossbar connector circuits to allow the interconnect blocks to transfer first information simultaneously with second information via at least one of the crossbar connector circuits.

4. The apparatus of claim 1, wherein a distance between any two consecutive connector circuits of the interconnect blocks is less than two millimeters.

5. A system comprising:
a plurality of processing cores formed on an integrated circuit chip;
at least one memory formed on the integrated circuit chip; and
an interconnect structure formed on an integrated circuit chip and coupled to a plurality of processing cores and the at least one memory, the interconnect structure including:
at least one crossbar formed on the integrated circuit chip; and
a plurality of interconnect blocks formed on the integrated circuit chip, each of the interconnect blocks coupled to at least one of the plurality of processing cores and to one of the at least one crossbar, each of the interconnect blocks having multiple ports including an ingress port formed on the integrated circuit chip and an egress port formed on the integrated circuit chip; and
wherein each of the at least one crossbar is located outside the plurality of interconnect blocks and coupled to one or more of the plurality of interconnect blocks to transfer information between a group of devices coupled to one of the plurality of interconnect blocks and another group of devices coupled to another one of the plurality of interconnect blocks via the crossbar, one of the at least one crossbar includes a first crossbar connector circuit, a second crossbar connector circuit, and a third crossbar connector circuit, a first transfer path to transfer information from the first crossbar connector circuit to the second and third crossbar connector circuits, a second transfer path to transfer information from the second crossbar connector circuit to the first and third crossbar connector circuits, and a third transfer path to transfer information the third crossbar connector circuit to the first and second and third crossbar connector circuits, and wherein the information transferred via ingress ports and egress ports of interconnect blocks, the devices including the plurality of processing cores and the memory, wherein each of the first, second, and third crossbar connector circuits includes a first port, a second port, and a third port, the first port including a first transmitter, the first transmitter including a first arbiter to perform a first arbitrating function to receive messages from receivers of the second and third ports upon simultaneous activation based on a first transfer order, the second port including a second transmitter, the second transmitter including a second arbiter to perform a second arbitrating function to receive messages from receivers of the first and third ports upon simultaneous activation based on a second transfer order, and the third port including a third transmitter, the third transmitter including a third arbiter to perform a third arbitrating function to receive messages from receivers of the first and second ports upon simultaneous activation based on a third transfer order.

6. The system of claim 5, wherein each of the first, second, and third crossbar connector circuits including a first port, a second port, a third port, and a number of connector transfers paths to transfer messages among the first, second, and third ports.

7. The system of claim 6, wherein each transfer path of the first, second, and third transfer paths of the crossbar includes a first path to transfer messages in a first direction, and a second path to transfer messages in a second direction, wherein the first path is separated from the second path, wherein each of the first path and the second path includes multiple lines to transfer multiple bits of the messages in parallel.

8. The system of claim 6, wherein each of the multiple ports of each of the interconnect blocks includes a receiver to receive information, and a transmitter to send information, and wherein each of the first, second, and third ports of each of the crossbar connector circuits includes a receiver to receive information, and a transmitter to send information.

9. The system of claim 8, wherein each of the multiple ports of each of the interconnect blocks is configured to determine a transfer direction based on an identification code associated with each of the interconnect blocks and a destination identification associated with the information to transfer the message from one of the multiple ports to another one of the multiple ports based on the transfer direction.

10. The system of claim 5, wherein one of the at least one crossbar includes a plurality of crossbar connector circuits, each of the of crossbar connector circuits coupled to one of the interconnect blocks, and wherein one of the at least one crossbar further includes a number of transfer paths coupled to the crossbar connector circuits to allow the interconnect blocks to transfer first information simultaneously with second information via at least one of the crossbar connector circuits.

11. An integrated circuit chip comprising:
a first crossbar connector circuit including a first port, a second port, and a third port;
a second crossbar connector circuit including a first port coupled to the first port of the first crossbar connector circuit, a second port, and a third port, the first port including a first transmitter, the first transmitter including a first arbiter to perform a first arbitrating function to receive first messages from receivers of the second and third ports upon simultaneous activation based on a first transfer order, the second port including a second transmitter, the second transmitter including a second arbiter to perform a second arbitrating function to receive second messages from receivers of the first and third ports upon simultaneous activation based on a second transfer order, and the third port including a third transmitter, the third transmitter including a third arbiter to perform a third arbitrating function to receive third messages from receivers of the first and second ports upon simultaneous activation based on a third transfer order;
a third crossbar connector circuit including a first port coupled to the second port of the first crossbar connector circuit, a second port coupled to the second port of the second crossbar connector circuit, and a third port;
a first branch connector circuit including a first port coupled to the third port of the second crossbar connector circuit, a second port to couple to a first device, and a third port;
a second branch connector circuit including a first port coupled to the second port of the first branch connector circuit, a second port to couple to a second device, and a third port to couple to a third device;
a third branch connector circuit including a first port, a second port, and a third port, the third port of the third branch connector circuit coupled to the third port of the third crossbar connector circuit, the second port of the third branch connector circuit to couple to a fourth device;
a fourth branch connector circuit including a first port, a second port, and a third port, the second port of the fourth branch connector circuit coupled to the first port of the third branch connector circuit, the third port of the fourth branch connector circuit to couple to a fifth device; and
a fifth branch connector circuit including a first port, a second port, and a third port, the second port of the fifth branch connector circuit coupled to the first port of the fourth branch connector circuit, the third port of the fourth branch connector circuit to couple to a sixth device.

12. The apparatus of claim 11, wherein the first, second, third, fourth, fifth, and sixth devices includes at least one of a processing core, a memory, and a cache memory.

13. The apparatus of claim 11, further comprising:
a sixth branch connector circuit including a first port to couple to a seven device, a second port coupled to the third port of the first crossbar connector circuit, and third port to couple to an eighth device.

14. The apparatus of claim 11, wherein the first crossbar connector circuit includes:
a first conductive path to transfer messages from the first port of the first crossbar connector circuit to the second and third ports of the first crossbar connector circuit;
a second conductive path to transfer messages from the second port of the first crossbar connector circuit to the first and third ports of the first crossbar connector circuit; and
a third conductive path to transfer messages from the third port of the first crossbar connector circuit to the first and second ports of the first crossbar connector circuit.

15. The apparatus of claim 14, wherein the second crossbar connector circuit includes:
a first conductive path to transfer messages from the first port of the second crossbar connector circuit to the second and third ports of the second crossbar connector circuit;
a second conductive path to transfer messages from the second port of the second crossbar connector circuit to the first and third ports of the second crossbar connector circuit; and
a third conductive path to transfer messages from the third port of the second crossbar connector circuit to the first and second ports of the second crossbar connector circuit.

16. The apparatus of claim 15, wherein the third crossbar connector circuit includes:
a first conductive path to transfer messages from the first port of the third crossbar connector circuit to the second and third ports of the third crossbar connector circuit;
a second conductive path to transfer messages from the second port of the third crossbar connector circuit to the first and third ports of the third crossbar connector circuit; and
a third conductive path to transfer messages from the third port of the third crossbar connector circuit to the first and second ports of the third crossbar connector circuit.

17. The apparatus of claim 16, wherein each of first, second, third, fourth, and fifth branch connector circuits includes a first conductive path, a second conductive path, and a third conductive path, and wherein within each branch connector circuit, the first conductive path is to transfer messages from the first port to the second and third ports, the second conductive path is to transfer messages from the second port to the first and third ports, and the third conductive path is to transfer messages from the third port to the first and second ports.

18. The apparatus of claim 17, wherein the first, second, and third transmitters are to transmit the first, second, and third messages, respectively, to a circuit interface, and wherein within each of the first, second, third, fourth, and fifth branch connector circuits, the first port includes a transmitter to receive messages from the second and third ports, and a receiver to send messages to the second and third ports.

* * * * *